(12) United States Patent
Shrestha et al.

(10) Patent No.: US 12,081,314 B2
(45) Date of Patent: Sep. 3, 2024

(54) SATELLITE AND BEAM SPECIFIC INFORMATION UPDATING IN NON-TERRESTRIAL NETWORKS

(71) Applicant: QUALCOMM Incorporated, San Diego, CA (US)

(72) Inventors: Bharat Shrestha, San Diego, CA (US); Ayan Sengupta, San Diego, CA (US); Xiao Feng Wang, San Diego, CA (US); Umesh Phuyal, San Diego, CA (US); Alberto Rico Alvarino, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 17/492,404

(22) Filed: Oct. 1, 2021

(65) Prior Publication Data
US 2022/0109496 A1 Apr. 7, 2022

Related U.S. Application Data

(60) Provisional application No. 63/087,079, filed on Oct. 2, 2020.

(51) Int. Cl.
*H04B 7/185* (2006.01)

(52) U.S. Cl.
CPC .............................. *H04B 7/18519* (2013.01)

(58) Field of Classification Search
CPC .............. H04B 7/18519; H04B 7/1855; H04B 7/18541
See application file for complete search history.

(56) References Cited

U.S. PATENT DOCUMENTS

| | | | |
|---|---|---|---|
| 2004/0017830 A1* | 1/2004 | Dale | H04W 28/18 370/465 |
| 2004/0029545 A1* | 2/2004 | Anderson | H04W 56/0035 455/161.1 |
| 2013/0109394 A1* | 5/2013 | Rangaiah | H04W 36/0061 455/437 |
| 2020/0153500 A1 | 5/2020 | Kim et al. | |
| 2020/0169955 A1* | 5/2020 | Chang | H04L 5/001 |
| 2020/0236644 A1* | 7/2020 | Gunnarsson | H04W 64/00 |
| 2021/0105693 A1 | 4/2021 | Tripathi et al. | |
| 2022/0046517 A1* | 2/2022 | Dang | H04W 48/04 |

OTHER PUBLICATIONS

International Search Report and Written Opinion—PCT/US2021/053269—ISA/EPO—Jan. 21, 2022.

* cited by examiner

*Primary Examiner* — Jamal Javaid
(74) *Attorney, Agent, or Firm* — Loza & Loza, LLP

(57) ABSTRACT

Aspects relate to mechanisms for wireless communication devices to update satellite and beam specific information. A user equipment (UE) selects a first cell associated with a first satellite for wireless communication in the non-terrestrial network. The UE determines whether to use one or more standard parameters or one or more satellite-cell specific parameters for accessing the first cell. The one or more standard parameters are based on one or more standard characteristics common to a plurality of satellites including the first satellite. The one or more satellite-cell specific parameters are based on a change to at least one standard characteristic of the one or more standard characteristics of the first satellite.

28 Claims, 10 Drawing Sheets

SATELLITE AND BEAM SPECIFIC INFORMATION UPDATING IN NON-TERRESTRIAL NETWORKS

CROSS-REFERENCE TO RELATED APPLICATIONS

The present application for patent claims priority to Provisional Application Ser. No. 63/087,079, titled "SATELLITE AND BEAM SPECIFIC INFORMATION UPDATING IN NON-TERRESTRIAL NETWORKS," filed Oct. 2, 2020, and assigned to the assignee hereof and hereby expressly incorporated by reference herein as if fully set forth below and for all applicable purposes.

TECHNICAL FIELD

The technology discussed below relates generally to wireless communication networks, and more particularly, to relate to satellite and beam specific information updating in non-terrestrial networks (NTNs).

BACKGROUND

Wireless communication between devices may be facilitated by various network configurations. In one configuration, a cellular network may enable wireless communication devices (e.g., user equipment (UEs)) to communicate with one another through signaling with a nearby base station or cell. Another wireless communication network configuration is a non-terrestrial network (NTN), in which wireless communication devices may signal a base station via a satellite, rather than signal a base station directly. For example, NTNs may utilize a plurality of satellites to facilitate communications between wireless communication devices and networks. Thus, the wireless communication devices may be configured for uplink and downlink signaling with one or more satellites to communicate with one or more base stations and/or one or more networks.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A method for wireless communication at a user equipment (UE) is provided. The method includes selecting a first cell associated with a first satellite for wireless communication in the non-terrestrial network. The method also includes determining whether to use one or more standard parameters or one or more satellite-cell specific parameters for accessing the first cell. The one or more standard parameters are based on one or more standard characteristics common to a plurality of satellites including the first satellite. The one or more satellite-cell specific parameters are based on a change to at least one standard characteristic of the one or more standard characteristics of the first satellite. The UE may then communicate with a base station via the first satellite using the one or more standard parameters or one or more satellite-cell specific parameters.

According to one aspect, the UE may receive a radio resource control (RRC) message indicating that the UE is to release from an active mode into an idle mode on a second cell before selecting the first cell.

In one example, the radio resource control message may further include at least one change in a priority to one or more satellites including the first satellite or one or more cells including the first cell and the second cell. The radio resource control message may indicate that the UE is to release from the active mode into the idle mode on a second cell before selecting the first cell, and select the first cell associated with the first satellite for the wireless communication in the non-terrestrial network based on the at least one change in priority.

In another example, the radio resource control message may further comprise a group identification identifying one or more satellite-cell groups for initiating reselection by the UE. The one or more satellite-cell groups may each include a list of one or more satellites and one or more beam identifications that share at least one of one or more same access parameters or one or more same beam configurations. The radio resource control message may also indicate that the UE is to release from the active mode into the idle mode on the second cell before selecting the first cell, and select the first cell associated with the first satellite for the wireless communication in the non-terrestrial network based on the group identification.

In yet another example, the radio resource control message may further comprise a list change indication of at least one change to a list of neighbor cells, an inter-frequency list, or an inter-radio access technology (inter-RAT) list, reselection information on a list of neighbor cells, reselection information on an inter-frequency list, or reselection information on an inter-radio access technology (inter-RAT) list. The radio resource control message may indicate that the UE is to release from the active mode into the idle mode on the second cell before selecting the first cell, and select the first cell associated with the first satellite for the wireless communication in the non-terrestrial network based on the list change indication.

In one aspect, the one or more standard parameters may comprise at least one of one or more satellite-cell access parameters, one or more satellite-cell configurations, one or more sets of beam information, or ephemeris information.

In various examples, the one or more standard characteristics may comprise at least one of a location of the first satellite, an earth area coverage associated with the first satellite, an indication of the base station associated with the first satellite, an indication of a feeder link providing communication between the first satellite and the base station, an indication of an access and mobility management function (AMF) associated with the first satellite, or an indication of a feeder link providing communication between the first satellite and an access and mobility management function.

According to one feature, the method may further comprise receiving a first system information block (SIB1) identifying the one or more standard parameters or the one or more satellite-cell specific parameters. Additionally, the determination of whether to use the one or more standard parameters or the one or more satellite-cell specific parameters for accessing the first cell may be based on whether the first system information block identifies the one or more standard parameters or the one or more satellite-cell specific parameters.

In one example, the first system information block may further comprise a first indication of at least one of: a current change or future change to beam pattern information associated with one or more other satellites located in area the includes the first satellite, or one or more beam pattern profile identifications of one or more beam pattern profiles associated with one or more other satellites associated with the area including the first satellite.

In another example, the first system information block may further comprise a second indication of at least one of: an ephemeris associated with the first satellite, beam pattern information associated with the first satellite, a list of one or more neighbor cells, or inter-frequency and inter-radio access technology (inter-RAT) cell reselection information.

In one feature, the first system information block may further comprise a system value tag associated with at least the first satellite.

In another feature, the first system information block further comprises a group identification identifying one or more satellite-cell groups for initiating reselection by the UE, wherein the one or more satellite-cell groups each include a list of one or more satellites and one or more beam identifications that share at least one of one or more same access parameters or one or more same beam configurations.

According to some aspects, the method may further include receiving a first system information block (SIB1) identifying the one or more standard parameters or the one or more satellite-cell specific parameters in response to determining to transition from a second cell associated with a second satellite. A determination is made on whether to use the one or more standard parameters or the one or more satellite-cell specific parameters for accessing the first cell is based on whether the first system information block identifies the one or more standard parameters or the one or more satellite-cell specific parameters.

According to other aspects, the method may also include receiving a first system information block identifying the one or more satellite-cell specific parameters for accessing the first cell. The determination of whether to use the one or more standard parameters or the one or more satellite-cell specific parameters for accessing the first cell may comprise: (a) identifying a list of one or more frequencies and one or more physical cell identifications (PCIDs) associated with the first satellite, and (b) identifying whether a frequency or a physical cell identification for accessing the first cell is included in the list.

In yet another aspect, determining whether to use the one or more standard parameters or the one or more satellite-cell specific parameters for accessing the first cell may comprise receiving a master information block (MIB) identifying the one or more standard parameters or one or more satellite-cell specific parameters. In some instances, the master information block may identify the one or more standard parameters or the one or more satellite-cell specific parameters in a bit field utilizing a signal bit.

Another feature of the method provides for receiving a master information block identifying whether to use the one or more standard parameters or the one or more satellite-cell specific parameters for accessing the first cell. A first system information block may also be received identifying either the one or more standard parameters or the one or more satellite-cell specific parameters for accessing the first cell. The determination of whether to use the one or more standard parameters or the one or more satellite-cell specific parameters for accessing the first cell may be based on whether the first system information block identifies the one or more standard parameters or the one or more satellite-cell specific parameters.

In one example, the method may further include: (a) identifying a release from an active mode into an idle mode on a second cell before selecting the first cell, and (b) receiving a radio resource control (RRC) message identifying the one or more standard parameters or the one or more satellite-cell specific parameters. The determination of whether to use the one or more standard parameters or the one or more satellite-cell specific parameters for accessing the first cell may comprise determining whether to use the one or more standard parameters or the one or more satellite-cell specific parameters for accessing the first cell based on whether the radio resource control message identifies the one or more standard parameters or the one or more satellite-cell specific.

In yet another aspect, at least one of the one or more standard parameters or one or more satellite-cell specific parameters may be associated with a fixed geographic area. For example, the fixed geographic area may be determined based on one of fixed tracking area identification, a virtual cell identification, or fixed cell identification.

A method for wireless communication at a base station is provided. The method includes transmitting, via a first cell associated with a first satellite of the one or more satellites, one or more standard parameters or one or more satellite-cell specific parameters for accessing the first cell. The one or more standard parameters are based on one or more standard characteristics common to a plurality of satellites including the second satellite. The one or more satellite-cell specific parameters are based on a change to at least one standard characteristic of the one or more standard characteristics of the second satellite. The method also includes receiving a satellite-cell connection request from the UE, via the first satellite, for accessing the first cell after transmitting the one or more standard parameters or the one or more satellite-cell specific parameters. The base station may then communicate with the UE via the first satellite.

According to one aspect, the base station may transmit a radio resource control (RRC) message indicating that the UE is to release from an active mode into an idle mode on a second cell before selecting the first cell.

In one example, the radio resource control message may further include at least one change in a priority to one or more satellites including the first satellite or one or more cells including the first cell and the second cell. The radio resource control message may indicate that the UE is to release from the active mode into the idle mode on a second cell before selecting the first cell, and select the first cell associated with the first satellite for the wireless communication in the non-terrestrial network based on the at least one change in priority.

In another example, the radio resource control message may further comprise a group identification identifying one or more satellite-cell groups for initiating reselection by the UE. The one or more satellite-cell groups may each include a list of one or more satellites and one or more beam identifications that share at least one of one or more same access parameters or one or more same beam configurations. The radio resource control message may also indicate that the UE is to release from the active mode into the idle mode on the second cell before selecting the first cell, and select the first cell associated with the first satellite for the wireless communication in the non-terrestrial network based on the group identification.

In yet another example, the radio resource control message may further comprise a list change indication of at least one change to a list of neighbor cells, an inter-frequency list, or an inter-radio access technology (inter-RAT) list, reselection information on a list of neighbor cells, reselection information on an inter-frequency list, or reselection information on an inter-radio access technology (inter-RAT) list. The radio resource control message may indicate that the UE is to release from the active mode into the idle mode on the second cell before selecting the first cell, and select the first cell associated with the first satellite for the wireless communication in the non-terrestrial network based on the list change indication.

In one example, receiving the satellite-cell connection request from the UE for accessing the first cell after determining whether to use the one or more standard parameters or the one or more satellite-cell specific parameters may comprises: (a) receiving the satellite-cell connection request from the UE for accessing the first cell based on the one or more standard parameters when transmitting the one or more standard parameters for accessing the first cell, and (b) receiving the satellite-cell connection request from the UE for accessing the first cell based on the one or more satellite-cell specific parameters when transmitting the one or more satellite-cell specific parameters for accessing the first cell.

In some examples, the one or more standard parameters may comprise at least one of one or more satellite-cell access parameters, one or more satellite-cell configurations, one or more sets of beam information, or ephemeris information.

In various instances, the one or more standard characteristics may comprise at least one of a location of the first satellite, an earth area coverage associated with the first satellite, an indication of a base station associated with the first satellite, an indication of a feeder link providing communication between the first satellite and a base station, an indication of an access and mobility management function (AMF) associated with the first satellite, or an indication of a feeder link providing communication between the first satellite and an access and mobility management function.

In one aspect, transmitting, via the first cell associated with the first satellite of the one or more satellites, the one or more standard parameters or the one or more satellite-cell specific parameters for accessing the first cell may comprise transmitting a first system information block (SIB1) identifying the one or more standard parameters or the one or more satellite-cell specific parameters. In one example, the first system information block may further comprise a first indication of at least one of: a current change or future change to beam pattern information associated with one or more other satellites located in area the includes the first satellite, or one or more beam pattern profile identifications of one or more beam pattern profiles associated with one or more other satellites associated with the area including the first satellite. In another example, the first system information block may further comprises a second indication of at least one of: an ephemeris associated with the first satellite, beam pattern information associated with the first satellite, a list of one or more neighbor cells, or inter-frequency and inter-radio access technology (inter-RAT) cell reselection information. In yet another example, the first system information block may further comprise a system value tag associated with at least the first satellite.

According to other instances, the first system information block may further comprises a grouping indication indicating one or more satellite-cell groups for initiating reselection by the UE, wherein the one or more satellite-cell groups each include a list of one or more satellites and one or more beam identifications that share at least one of one or more same access parameters or one or more same beam configurations.

In one example, transmitting, via the first cell associated with the first satellite of the one or more satellites, the one or more standard parameters or the one or more satellite-cell specific parameters for accessing the first cell may comprise transmitting a first system information block identifying the one or more standard parameters or the one or more satellite-cell specific parameters in response to determining that the UE is to transition from a second cell associated with a second satellite.

In another example, transmitting, transmitting, via the first cell associated with the first satellite of the one or more satellites, the one or more standard parameters or the one or more satellite-cell specific parameters for accessing the first cell may comprise transmitting a master information block (MIB) identifying the one or more standard parameters or the one or more satellite-cell specific parameters. The master information block may identify the one or more standard parameters or the one or more satellite-cell specific parameters in a bit field utilizing a signal bit.

In yet another example, transmitting, via the first cell associated with the first satellite of the one or more satellites, the one or more standard parameters or the one or more satellite-cell specific parameters for accessing the first cell may comprise (a) transmitting a master information block identifying whether to use the one or more standard parameters or the one or more satellite-cell specific parameters for accessing the first cell, and (b) transmitting a first system information block identifying either the one or more standard parameters or the one or more satellite-cell specific parameters for accessing the first cell.

In some implementations, the method may further include (a) identifying that the UE has released from an active mode into an idle mode on a second cell before selecting the first cell, and (b) transmitting a radio resource control (RRC) message identifying the one or more standard parameters or the one or more satellite-cell specific parameters.

In some instances, at least one of the one or more standard parameters or one or more satellite-cell specific parameters may be associated with a fixed geographic area. The fixed geographic area may be determined based on one of fixed tracking area identification, a virtual cell identification, or fixed cell identification.

A user equipment (UE) in a non-terrestrial network (NTN) of a wireless communication system is provided. The UE includes a wireless transceiver. The UE also includes a memory. The UE further includes a processor communicatively coupled to the wireless transceiver and the memory. The processor and the memory are configured to select a first cell associated with a first satellite for wireless communication in the non-terrestrial network. The processor and the memory are also configured to determine whether to use one or more standard parameters or one or more satellite-cell specific parameters for accessing the first cell. The one or more standard parameters are based on one or more standard characteristics common to a plurality of satellites including the first satellite. The one or more satellite-cell specific parameters are based on a change to at least one standard characteristic of the one or more standard characteristics of the first satellite. The UE may then communicate with the base station via the first satellite using the one or more standard parameters or one or more satellite-cell specific parameters.

A base station in a non-terrestrial network (NTE) of a wireless communication system is provided. The base station includes a wireless transceiver. The base station also includes a memory. The base station further includes a processor communicatively coupled to the wireless transceiver and the memory. The processor and the memory are configured to transmit, via a first cell associated with a first satellite of the one or more satellites, one or more standard parameters or one or more satellite-cell specific parameters for accessing the first cell. The one or more standard parameters are based on one or more standard characteristics common to a plurality of satellites including the second satellite. The one or more satellite-cell specific parameters are based on a change to at least one standard characteristic of the one or more standard characteristics of the second satellite. The processor and the memory are also configured to receive a satellite-cell connection request from the UE, via the first satellite, for accessing the first cell after transmitting the one or more standard parameters or the one or more satellite-cell specific parameters. The base station may then communicate with the UE via the first satellite using the one or more standard parameters or one or more satellite-cell specific parameters.

A non-transitory, processor-readable storage medium of a user equipment (UE) having instructions stored thereon is provided. The instructions, when executed by a processing circuit, cause the processing circuit to select a first cell associated with a first satellite for wireless communication in the non-terrestrial network. The instructions, when executed by the processing circuit, also cause the processing circuit to determine whether to use one or more standard parameters or one or more satellite-cell specific parameters for accessing the first cell. The one or more standard parameters are based on one or more standard characteristics common to a plurality of satellites including the first satellite. The one or more satellite-cell specific parameters are based on a change to at least one standard characteristic of the one or more standard characteristics of the first satellite. The UE may then communicate with the base station via the first satellite using the one or more standard parameters or one or more satellite-cell specific parameters.

A non-transitory, processor-readable storage medium of a base station having instructions stored thereon is provided. The instructions, when executed by a processing circuit, cause the processing circuit to transmit, via a first cell associated with a first satellite of the one or more satellites, one or more standard parameters or one or more satellite-cell specific parameters for accessing the first cell. The one or more standard parameters are based on one or more standard characteristics common to a plurality of satellites including the second satellite. The one or more satellite-cell specific parameters are based on a change to at least one standard characteristic of the one or more standard characteristics of the second satellite. The instructions, when executed by the processing circuit, also cause the processing circuit to receive a satellite-cell connection request from the UE, via the first satellite, for accessing the first cell after transmitting the one or more standard parameters or the one or more satellite-cell specific parameters. The base station may then communicate with the UE via the first satellite using the one or more standard parameters or one or more satellite-cell specific parameters.

A user equipment (UE) is provided. The UE includes a means for selecting a first cell associated with a first satellite for wireless communication in the non-terrestrial network. The UE also includes a means for determining whether to use one or more standard parameters or one or more satellite-cell specific parameters for accessing the first cell. The one or more standard parameters are based on one or more standard characteristics common to a plurality of satellites including the first satellite. The one or more satellite-cell specific parameters are based on a change to at least one standard characteristic of the one or more standard characteristics of the first satellite. The UE may also include means to communicate with the base station via the first satellite using the one or more standard parameters or one or more satellite-cell specific parameters.

A base station is provided. The base station includes a means for transmitting, via a first cell associated with a first satellite of the one or more satellites, one or more standard parameters or one or more satellite-cell specific parameters for accessing the first cell. The one or more standard parameters are based on one or more standard characteristics common to a plurality of satellites including the second satellite. The one or more satellite-cell specific parameters are based on a change to at least one standard characteristic of the one or more standard characteristics of the second satellite. The base station also includes a means for receiving a satellite-cell connection request from the UE, via the first satellite, for accessing the first cell after transmitting the one or more standard parameters or the one or more satellite-cell specific parameters. The base station may also include means to communicate with the UE via the first satellite using the one or more standard parameters or one or more satellite-cell specific parameters.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
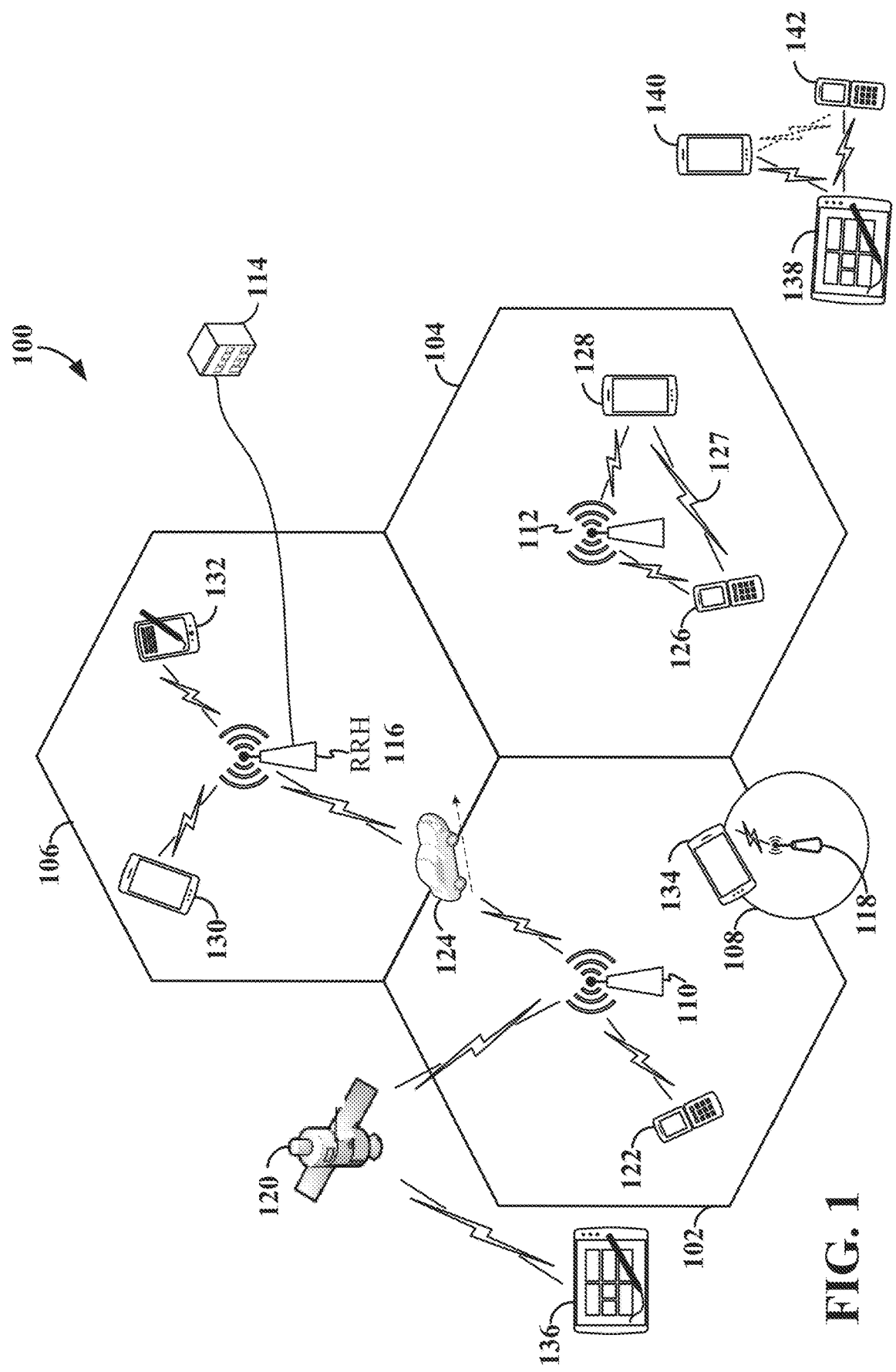
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to a user equipment (UE) in communication with a base station via one or more satellites in a non-terrestrial network (NTN). When the UE is selecting a satellite or a cell of a satellite for wireless communication, the UE may acquire ephemeris and beam information associated with the cell and/or the satellite. Ephemeris may include a trajectory of an object such as a naturally occurring astronomical object or an artificial satellite in the sky, moving through space, or orbiting a planet. Ephemeris may include the position and/or the velocity of an object over time. The UE may not store ephemeris of a satellite in a particular constellation and instead may, when initiating a cell reselection process, utilize inter-frequency priorities to prioritize the frequency of a satellite of a same constellation for cell reselection.

For cell reselection, a UE may know, for a particular constellation, a first satellite's estimated position, frequency, physical cell identification (PCID), S-criteria parameters, and beam information (e.g., polarization) as well as cell visibility duration for the cell and the first satellite and beam center positions of current and one or more future beams. The UE may pre-populate future times (e.g., t1, t2, t3, . . . , tN) when the UE would need to check (e.g., regardless of priority and measurement rules) frequency and PCID information from neighboring satellites or trigger cell reselection. For example, the UE may not be required to consider cells in a particular one or more frequencies until a pre-populated future time arrives even if the UE is performing measurement procedures. The pre-populated future times may be calculated based on an ephemeris for one or more satellites and may be updated by the UE periodically.

In some cases, when performing cell reselection for a next satellite, the UE may forgo measurement procedures as well as reading a first system information block (SIB1) based on an assumption that access parameters, common configurations, and beam information stored in the UE and used with the previous cell or satellite may also be used for a next cell or satellite. However, a beam pattern, specific beam information, and/or satellite ephemeris accuracy may change over time or may no longer be accurate after a period of time. For example, a location of a next satellite or earth coverage area of a next satellite may have changed. As another example, a feeder link of a next satellite may belong to a new base station or a feeder link of a next satellite may belong to a new access and mobility management function (AMF). As described herein, the UE may implement various methods and processes to obtain updated satellite and/or beam specific information for cell or satellite selection or cell or satellite reselection.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. A radio access network (RAN) 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a satellite 120, which may be configured to function as a base station or a relay between a UE and a base station. That is, in some examples, a cell may not necessarily be stationary, and the geographic area of the cell may move according to the location of a mobile base station such as the satellite 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., satellite 120) may be configured to function as a UE. For example, the satellite 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a transmitting sidelink device, and UEs 140 and 142 may function as a scheduled entity or a receiving sidelink device. For example, UE 138 may function as a scheduling entity in a device-to-device (D2D), peer-to-peer (P2P), vehicle-to-everything (V2X), and/or in a mesh network. In a mesh network example, UEs 140 and 142 may optionally communicate directly with one another in addition to communicating with the scheduling entity (e.g., UE 138).

In some aspects of the present disclosure, two or more UEs (e.g., UEs 126 and 128) within the coverage area of a serving base station 112 may communicate with each other using sidelink signals 127 without relaying that communication through the base station. In this example, the base station 127 or one or both of the UEs 126 and 128 may function as scheduling entities to schedule sidelink communication between UEs 126 and 128. For example, UEs 126 and 128 may communicate sidelink signals 127 within a vehicle-to-everything (V2X) network.

Two primary technologies that may be used by V2X networks include dedicated short-range communication (DSRC) based on the Institute of Electrical and Electronics Engineers (IEEE) 802.11p standards and cellular V2X based on Long-Term Evolution (LTE) and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 2:
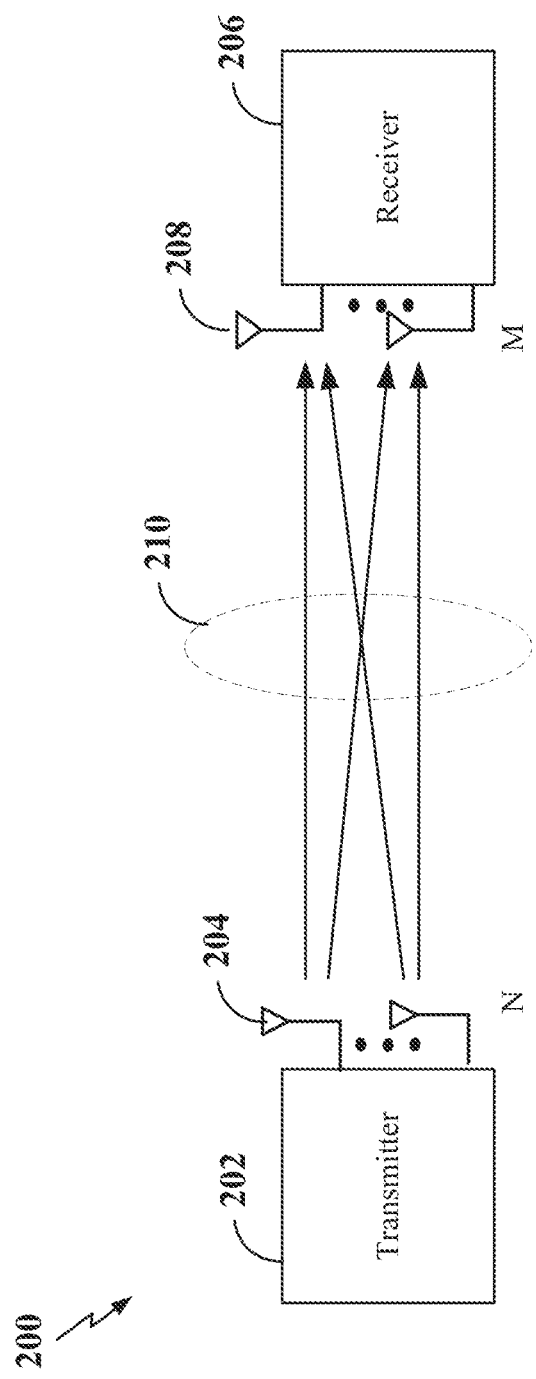
FIG. 2 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 2 illustrates an example of a wireless communication system 200 supporting beamforming and/or MIMO. In a MIMO system, a transmitter 202 includes multiple transmit antennas 204 (e.g., N transmit antennas) and a receiver 206 includes multiple receive antennas 208 (e.g., M receive antennas). Thus, there are N×M signal paths 210 from the transmit antennas 204 to the receive antennas 208. Each of the transmitter 202 and the receiver 206 may be implemented, for example, within a scheduling entity, a scheduled entity, or any other suitable device. In some examples, the transmitter and receiver are each wireless communication devices (e.g., UEs or V2X devices) communicating over a sidelink channel.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 200 is limited by the number of transmit or receive antennas 204 or 208, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 2, a rank-2 spatial multiplexing transmission on a 2×2 MIMO antenna configuration will transmit one data stream from each transmit antenna 204. Each data stream reaches each receive antenna 208 along a different signal path 210. The receiver 206 may then reconstruct the data streams using the received signals from each receive antenna 208.

Beamforming is a signal processing technique that may be used at the transmitter 202 or receiver 206 to shape or steer an antenna beam (e.g., a transmit beam or receive beam) along a spatial path between the transmitter 202 and the receiver 206. Beamforming may be achieved by combining the signals communicated via antennas 204 or 208 (e.g., antenna elements of an antenna array module) such that some of the signals experience constructive interference while others experience destructive interference. To create the desired constructive/destructive interference, the transmitter 202 or receiver 206 may apply amplitude and/or phase offsets to signals transmitted or received from each of the antennas 204 or 208 associated with the transmitter 202 or receiver 206.

In 5G New Radio (NR) systems, particularly for FR2 (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub 6 GHz systems. In addition, beamformed signals may further be utilized in D2D systems, such as NR SL or V2X, utilizing FR2.

Figure 3:
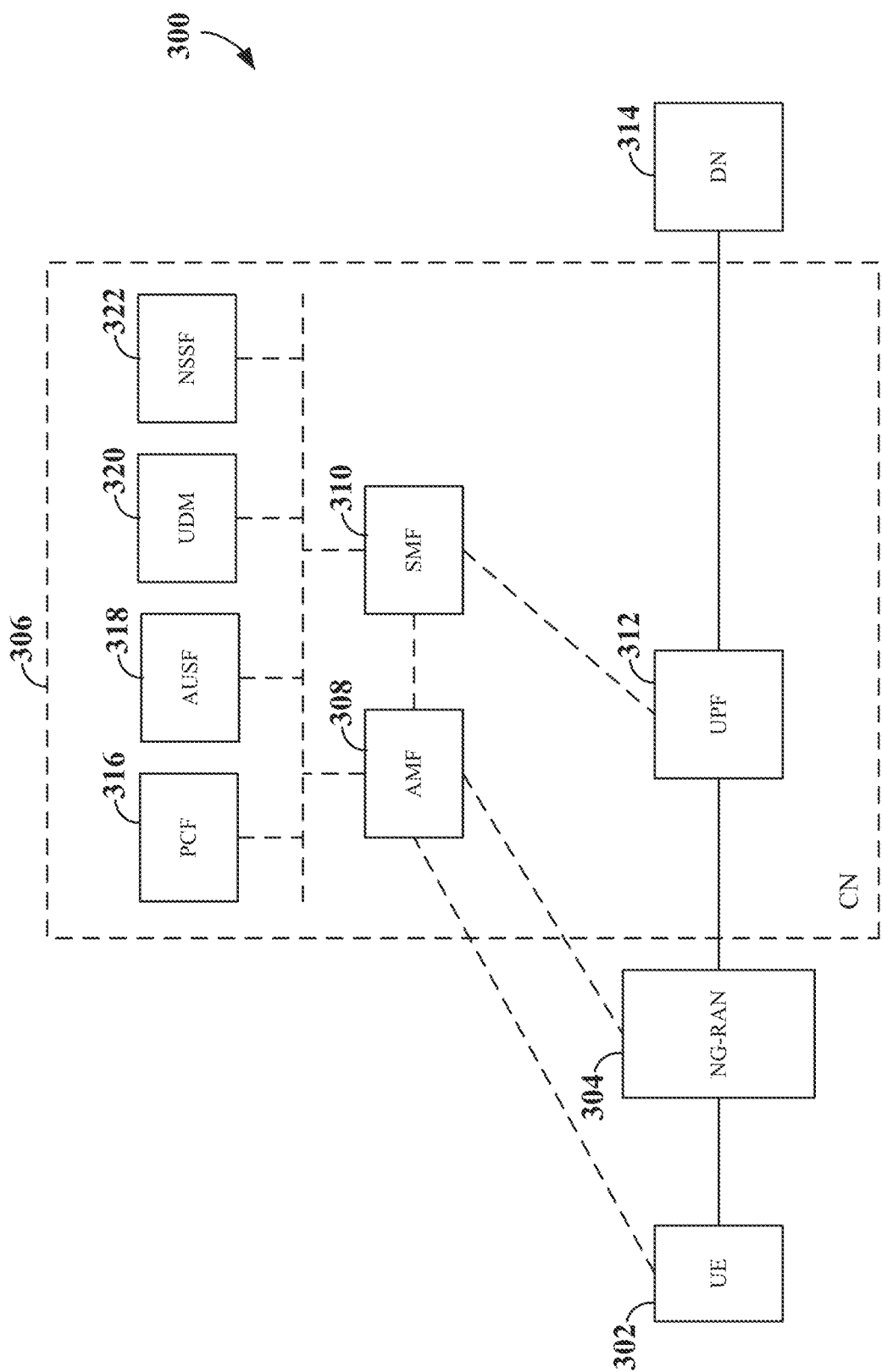
FIG. 3 is a conceptual illustration of an example of a radio access network according to some aspects.

Referring now to FIG. 3, by way of example and without limitation, a block diagram illustrating an example of various components of a 5G wireless communication system (5GS) 300 is provided. In some examples, the 3GS 300 may be the same wireless communication system 100 described above and illustrated in FIG. 1. The 3GS 300 includes a user equipment (UE) 302, a NR-RAN 304, and a core network 306. By virtue of the wireless communication system 300, the UE 302 may be enabled to carry out data communication with an external data network (DN) 314, such as (but not limited to) the Internet or an Ethernet network.

The core network 306 may include, for example, an access and mobility management function (AMF) 308, a session management function (SMF) 310, and a user plane function (UPF) 312. The AMF 308 and SMF 310 employ control plane (e.g., Non Access Stratum (NAS)) signaling to perform various functions related to mobility management and session management for the UE 302. For example, the AMF 308 provides connectivity, mobility management and authentication of the UE 302, while the SMF 310 provides session management of the UE 302 (e.g., processes signaling related to protocol data unit (PDU) sessions between the UE 302 and the external DN 314). The UPF 312 provides user plane connectivity to route 5G (NR) packets to/from the UE 302 via the NR-RAN 304.

The core network 306 may further include other functions, such as a policy control function (PCF) 316, authentication server function (AUSF) 318, unified data management (UDM) 320, network slice selection function (NSSF) 322, and other functions (not illustrated, for simplicity). The PCF 316 provides policy information (e.g., rules) for control plane functions, such as network slicing, roaming, and mobility management. In addition, the PCF 316 supports 5G quality of service (QoS) policies, network slice policies, and other types of policies. The AUSF 318 performs authentication of UEs 302. The UDM 320 facilitates generation of authentication and key agreement (AKA) credentials, performs user identification and manages subscription information and UE context. The NSSF 322 redirects traffic to a network slice. Network slices may be defined, for example, for different classes of subscribers or use cases, such as smart home, Internet of Things (IoT), connected car, smart energy grid, etc. Each use case may receive a unique set of optimized resources and network topology (e.g., a network slice) to meet the connectivity, speed, power, and capacity requirements of the use case.

To establish a connection to the 5G core network 306 via the NR-RAN 304, the UE 302 may transmit a registration request and PDU session establishment request to the 5G core network 306 via the NR-RAN 304. The AMF 308 and SMF 310 may process the registration request and PDU session establishment request and establish a data network session (DNS) between the UE 302 and the external DN 314 via the UPF 312. A DNS may include one or more sessions (e.g., data sessions or data flows) and may be served by multiple UPFs 312 (only one of which is shown for convenience). Examples of data flows include, but are not limited to, internet protocol (IP) flows, Ethernet flows and unstructured data flows.

Various aspects of the present disclosure will be described with reference to an OFDM waveform, schematically illustrated in FIG. 6. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
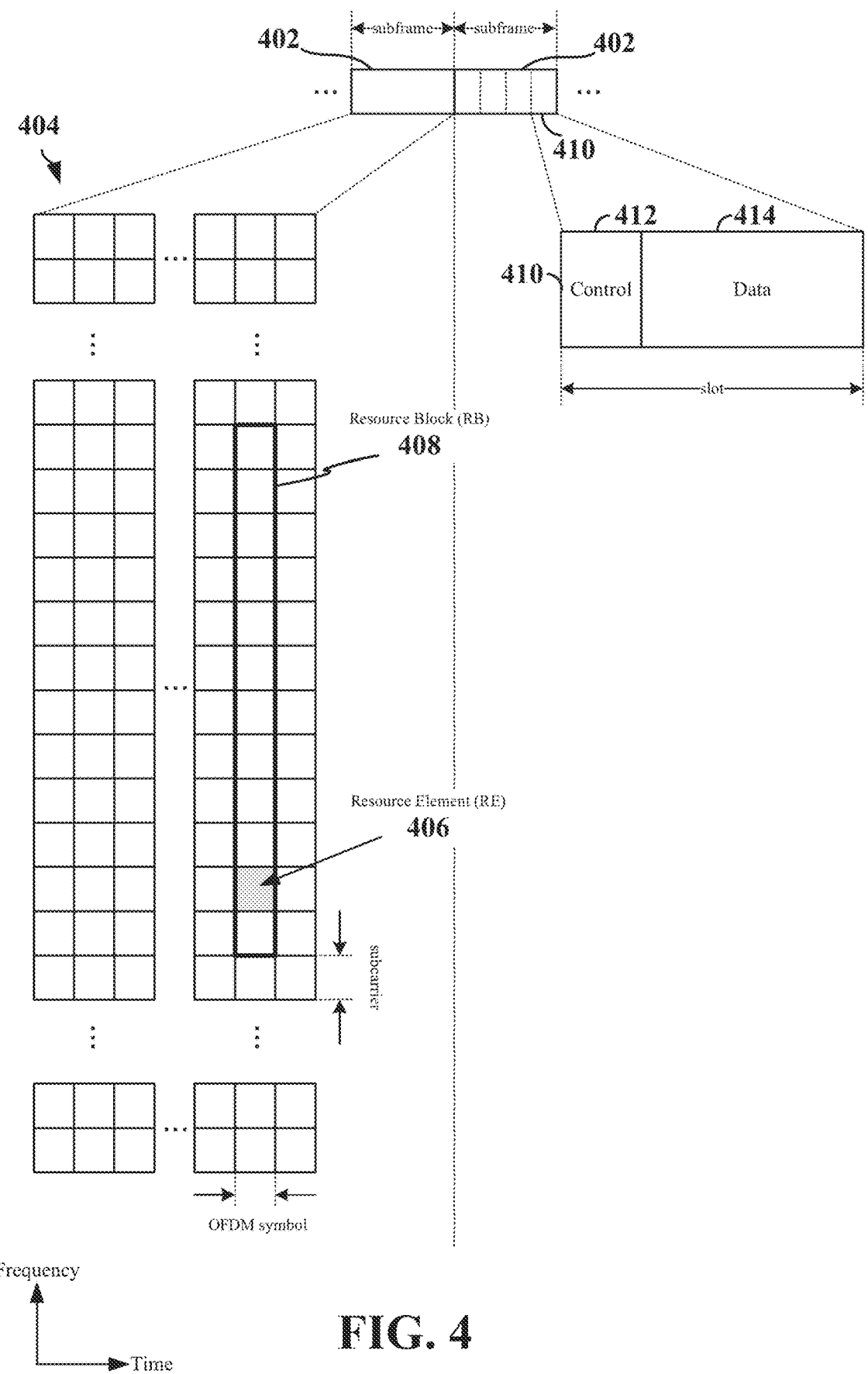
FIG. 4 is a diagram illustrating an example of a frame structure for use in a wireless communication network according to some aspects.

Referring now to FIG. 4, an expanded view of an exemplary subframe 402 is illustrated, showing an OFDM resource grid. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 406 within one or more sub-bands. Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). Hybrid automatic repeat request (HARQ) is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414)

to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB and/or a sidelink CSI-RS, may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

Figure 5:
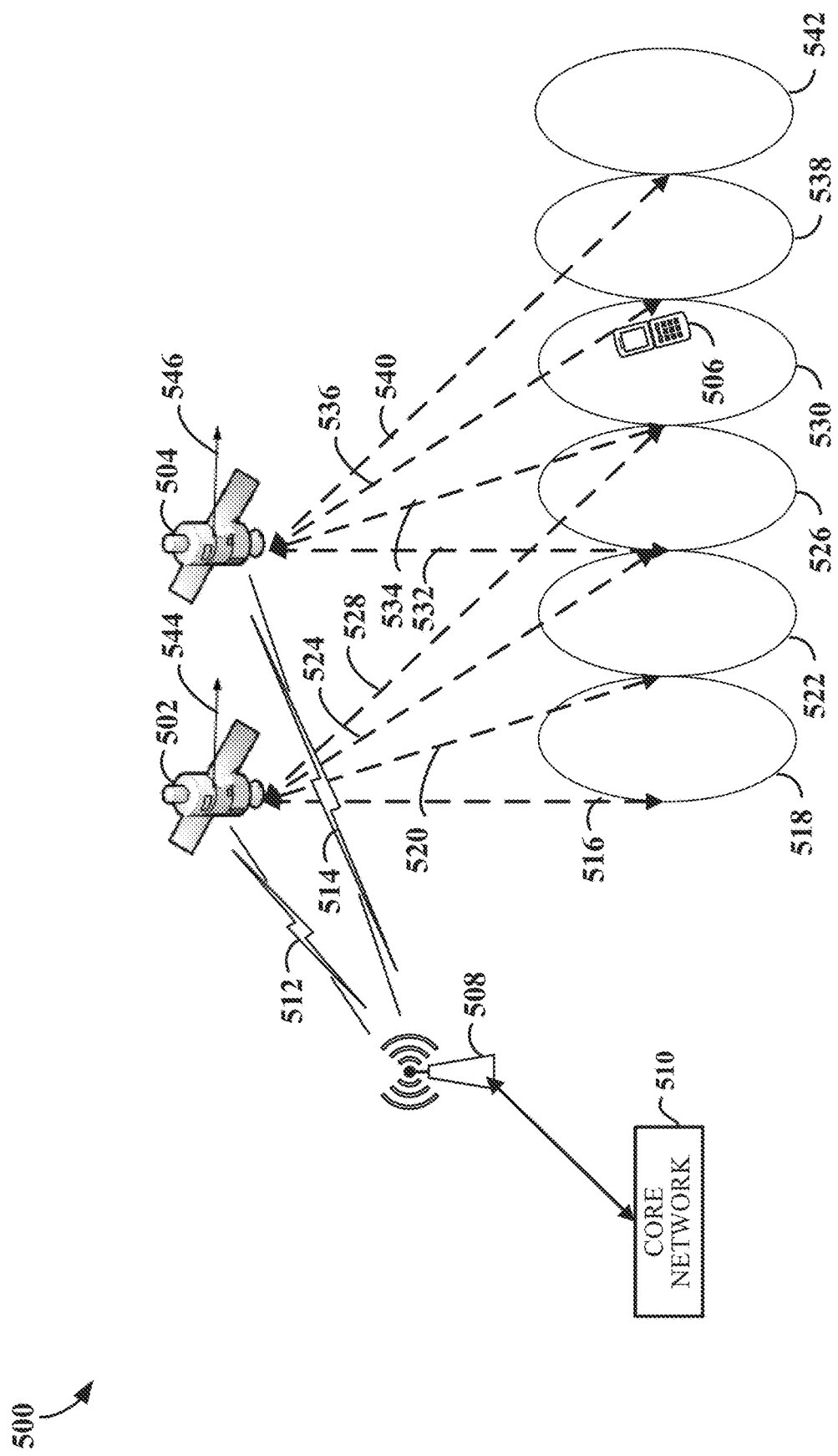
FIG. 5 is a diagram illustrating an example non-terrestrial network (NTN) according to some aspects.

FIG. 5 is a conceptual diagram illustrating an exemplary non-terrestrial network (NTN). Referring to FIG. 5, a non-terrestrial network (NTN) 500 may include a first satellite 502, a second satellite 504, a scheduled entity or user equipment (UE) 506, a base station 508, and a core network 510. In some aspects, the base station 508 may be or may include a gateway. In some aspects, each of the first satellite 502 and the second satellite 504 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform, or the like.

As shown in the FIG. 5, the UE 506 may be located on a terrestrial location and be in communication with at least one of the first satellite 502 or the second satellite 504 located in a non-terrestrial location. The first satellite 502 may be in communication with the base station 508 and the core network 510 via a first feeder link 512. In some examples, the core network 510 may be in communication with a data network. The first satellite 502 may include a plurality of beams and associated cells. For example, the first satellite 502 may include a first beam 516 associated with a first cell 518, a second beam 520 associated with a second cell 522, a third beam 524 associated with a third cell 526, and fourth beam 528 associated with a fourth cell 530. The second satellite 504 may be in communication with the base station 508 and the core network 510 via a second feeder link 514. The second satellite 504 may include a plurality of beams and associated cells. The second satellite 504 may include a fifth beam 532 associated with the third cell 526, a sixth beam 534 associated with the fourth cell 530, a seventh beam 536 associated with a fifth cell 538, and an eighth beam 540 associated with a sixth cell 542. As shown in FIG. 5, the first satellite 502 moves in the first direction 544 and the second satellite moves in the second direction 546. As the first satellite 502 moves in the first direction 544, the beams and cells associated with the first satellite 502 move in a similar direction. Also, second satellite 504 moves in the second direction 546, the beams and cells associated with the second satellite 504 move in a similar direction.

The UE 506 may be capable of performing NR communications (e.g., downlink communication and uplink communication) with both the first satellite 502 and the second satellite 504 when located in a cell associated with the respective satellite. In some examples, initially, the UE 506 may be in communication with the second satellite 504. For example, at a first time (0), the UE 500 may be located in the fourth cell 530 and may be communicating with the second satellite 504 via the sixth beam 534. At a second time (t2), the second satellite 504 and the first satellite 502 may have moved in the respective directions 546 and 544, and the UE 506 may initiate cell and/or satellite selection or reselection as the UE 506 changes from the fourth cell 530 to the third cell 526. For example, upon entering into an idle mode in the fourth cell 530, the UE 506 may initiate cell and/or satellite selection or reselection. The UE 506 may select the second satellite 504 and/or the fifth beam 532 to communication with the second satellite 504. As another example, the UE 506 may select the first satellite 502 and/or the fourth beam 528 as both the first satellite 502 and the second satellite 504 as well as the fourth beam 528 and the fifth beam 532 are associated with the third cell 526. The UE 506 may utilize one or more standard parameters or one or more satellite-cell specific parameters as described herein to move to a new cell and/or a new satellite.

Various aspects of the disclosure relate to a user equipment (UE) in communication with a base station via one or more satellites in a non-terrestrial network (NTN). When the UE is selecting a satellite or a cell of a satellite for wireless communication, the UE may acquire ephemeris and beam information associated with the cell and/or the satellite. Ephemeris may include a trajectory of an object such as a naturally occurring astronomical object or an artificial satellite in the sky, moving through space, or orbiting a planet. Ephemeris may include the position and/or the velocity of an object over time. The UE may not store ephemeris of a satellite in a particular constellation and instead may, when initiating a cell reselection process, utilize inter-frequency priorities to prioritize the frequency of a satellite of a same constellation for cell reselection.

For cell reselection, a UE may know, for a particular constellation, a first satellite's estimated position, frequency, physical cell identification (PCID), S-criteria parameters, and beam information (e.g., polarization) as well as cell visibility duration for the cell and the first satellite and beam center positions of current and one or more future beams. The UE may pre-populate future times (e.g., t1, t2, t3, . . . , tN) when the UE would need to check (e.g., regardless of priority and measurement rules) frequency and PCID information from neighboring satellites or trigger cell reselection. For example, the UE may not be required to consider cells in a particular one or more frequencies until a pre-populated future time arrives even if the UE is performing measurement procedures. The pre-populated future times may be calculated based on an ephemeris for one or more satellites and may be updated by the UE periodically.

In some cases, when performing cell reselection for a next satellite, the UE may forgo measurement procedures as well as reading a first system information block (SIB1) based on an assumption that access parameters, common configurations, and beam information stored in the UE and used with the previous cell or satellite may also be used for a next cell or satellite. However, a beam pattern, specific beam information, and/or satellite ephemeris accuracy may change over time or may no longer be accurate after a period of time. For example, a location of a next satellite or earth coverage area of a next satellite may have changed. As another example, a feeder link of a next satellite may belong to a new base station or a feeder link of a next satellite may belong to a new access and mobility management function (AMF). As described herein, the UE may implement various methods and processes to obtain updated satellite and/or beam specific information for cell or satellite selection or cell or satellite reselection.

Various aspects of the disclosure relate to a user equipment (UE) in communication with a base station via one or more satellites in a non-terrestrial network (NTN). The UE may select a first cell associated with a first satellite for wireless communication in the non-terrestrial network. The UE may determine whether to use one or more standard parameters or one or more satellite-cell specific parameters for accessing the first cell. For example, the UE may have received a first system information block (SIB1), a master information block (MIB), or a radio resource control (RRC) message including one of the one or more standard parameters or one or more satellite-cell specific parameters for accessing the first cell. The UE may determine whether to use the one or more standard parameters or the one or more satellite-cell specific parameters based on identifying whether the SIB1, the MIB, or the RRC message includes the one or more standard parameters or the one or more satellite-cell specific parameters. The one or more standard parameters may be based on one or more standard characteristics common to a plurality of satellites including the first satellite. The one or more satellite-cell specific parameters may be based on a change to at least one standard characteristic of the one or more standard characteristics of the first satellite. The UE may transmit a satellite-cell connection request to the first satellite for accessing the first cell after determining whether to use the one or more standard parameters or the one or more satellite-cell specific parameters.

Figure 6:
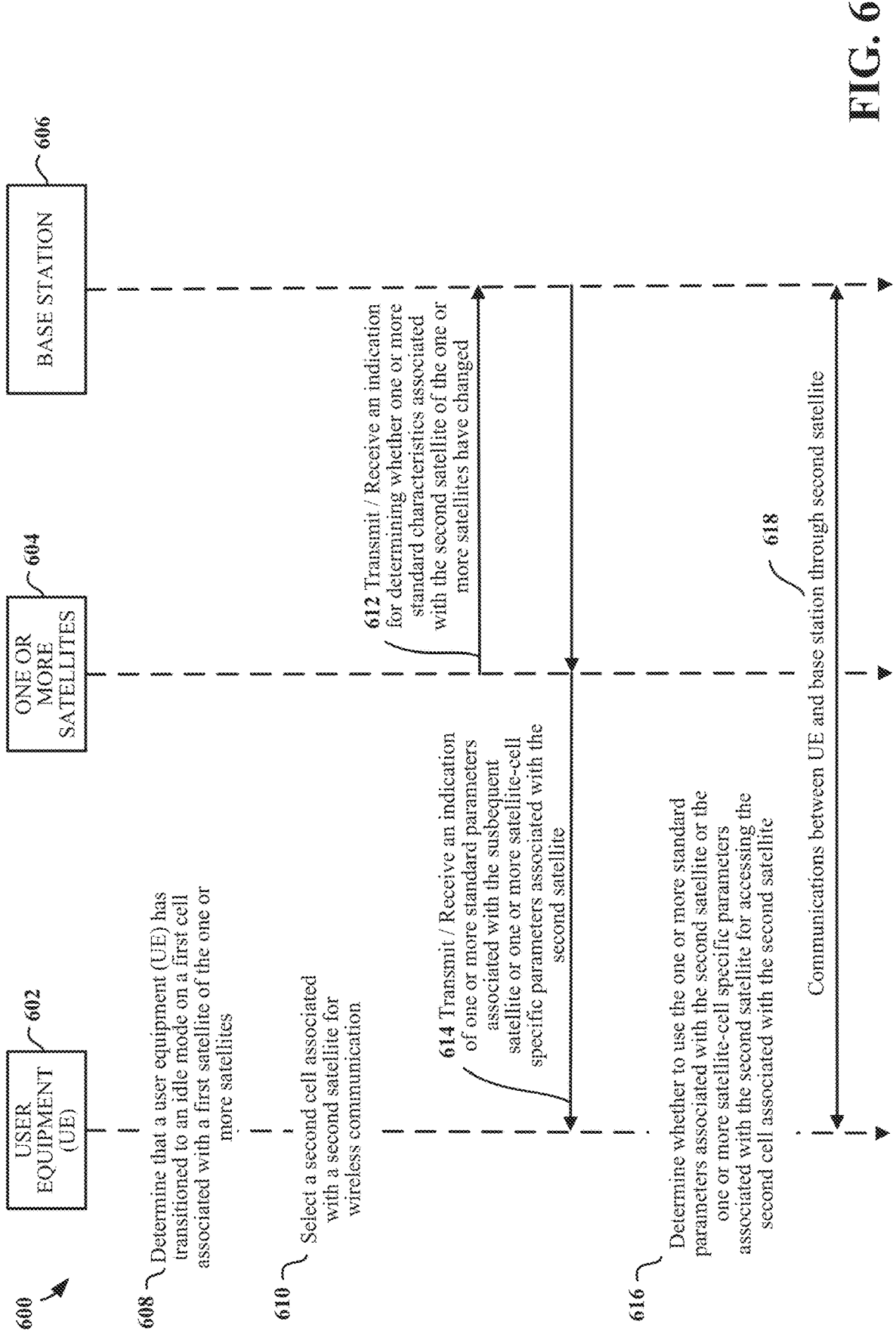
FIG. 6 is a conceptual signaling diagram illustrating an example environment for updating satellite and beam specific information according to some aspects.

FIG. 6 is a conceptual signaling diagram illustrating an example environment 600 for updating satellite and beam specific information according to some aspects. In the example shown in FIG. 6, a user equipment (UE) 602 is in wireless communication, via one or more satellites 604, with a base station 606 over one or more wireless communication links. The base station 606 may be in communication with a core network as described herein. Each of the UE 602, the one or more satellites 604, and the base station 606 may correspond to any of the entities, gNodeBs, UEs, V2X device, or D2D devices, quadcopter or drone, an access and mobility management function (AMF), or the like as shown in FIGS. 1-3 and 5. In some aspects, the base station 606 may be in wireless communication with at least one satellite of the one or more satellites via a feeder link. In some aspects, the UE 602 may be in wireless communication with at least one satellite of the one or more satellites 604 via an access link (e.g. an uplink).

At 608, the user equipment (UE) 602 may determine that the UE 602 has transitioned to an idle mode on a first cell associated with a first satellite (e.g., an initial satellite) of the one or more satellites 604. For example, the UE 602 may have been in an active mode on a first cell associated with the first satellite of the one or more satellites 604 and transition to an idle mode after a period of minimal activity or no activity on the first cell. The transition to the idle mode may be due to receiving a release message (e.g., an RCCRelease message) instructing the UE to transition to the idle mode, a lack of use of the UE 602, a change in quality of one or more frequencies associated with the first cell, a change in terrestrial position of the UE 602, a passage of a period of time by a which the first satellite of the one or more satellites 604 or the first cell may have moved further away from the terrestrial position of the UE 602, or the like. In response to transitioning to the idle mode on the first cell of the first satellite of the one or more satellites, the UE 602 may initiate a cell reselection process. In some examples, the UE 602 may have initially been powered on and initiate a cell selection process rather than a cell reselection process to select a cell and/or a satellite of the one or more satellites 604 for wireless communication on the non-terrestrial network.

At 610, the UE 602 may select a second cell associated with a second satellite (e.g., a neighbor satellite, a second satellite) of the one or more satellites 604 for wireless communication. For example, the UE 602 may receive and decode Primary Sync Signal (PSS) and Secondary Sync Signal (SSS) to the physical cell identification (PCID) for a plurality of cells and/or a plurality of satellites. The UE 602 may choose the second cell associated with the second satellite having the best beam and decode content information of a physical broadcast channel (PBCH).

In some aspects, the UE 602 may select the second cell of the second satellite of the one or more satellites 604 based on quality of one or more parameters associated with the second cell. As another example, the UE 602 may receive a plurality of indications of one or more standard parameters each associated with a cell of satellite of the one or more satellites 604 or one or more satellite-cell specific parameters each associated with a cell of satellite of the one or more satellites 604. The UE 602 may determine that one or more parameters associated with the second satellite (or a cell of the second satellite) contains optimal parameters (e.g., an optimal set of parameters relative to parameters contained in the remaining indications for a remaining set of cell and/or satellites). The UE 602 may select the second cell of the second UE based on one or more optimal parameters contained in the received indication.

At 612, the base station 606 may receive an indication from the second satellite (e.g., a neighboring satellite for cell reselection, a closest one or more satellites for cell selection) for determining whether one or more standard characteristics associated with the second satellite have changed. For example, base station 606 may determine and/or receive an indication from the second satellite for determining whether at least one of a location of the second satellite has change (e.g., for a scheduled or predicted position), an earth area coverage associated with the second satellite has changed (e.g., from a scheduled or predicted earth area coverage), a base station associated with the second satellite has changed, a feeder link providing communication between the second satellite and an associated base station has changed, an access and mobility management function (AMF) associated with the second satellite has change, a feeder link providing communication between the second satellite and a mobility management function has changed.

At 614, the UE 602 may receive an indication from the base station 606, via at least one satellite of the one or more satellites 604 (e.g., the first satellite, the second satellite), of one or more standard parameters associated with the second satellite or one or more satellite-cell specific parameters associated with the second satellite. For example, the base station 606 may have received an indication from the second satellite and determined that no changes to any of the one or more standard characteristics (e.g., scheduled parameters, pre-determined parameters) associated with the second satellite have occurred. In response to determining that no changes to any of the one or more standard characteristics associated with the second satellite have occurred, the base station 606 may transmit, via at least one satellite of the one or more satellites 604 (e.g., the second satellite) an indication of one or more standard parameters associated with the second satellite or a cell of the second satellite. The one or more standard parameters may include at least one of one or more satellite-cell access parameters, one or more satellite-cell configurations, or one or more sets of beam information, ephemeris information, or the like.

As another example, the base station 606 may have received an indication from the second satellite and determined that at least one change to one or more of the standard characteristics (e.g., scheduled parameters, pre-determined parameters) associated with the second satellite has occurred. In response to determining that at least one change to one or more of the standard characteristics associated with the second satellite have occurred, the base station 606 may transmit, via at least one satellite of the one or more satellites 604 (e.g., the second satellite) an indication of one or more satellite-cell specific parameters associated with the second satellite or a cell of the second satellite.

In some aspects, the indication, received by the UE 602 from the base station 606, via at least one satellite of the one or more satellites 604 (e.g., the second satellite), of one or more standard parameters associated with the second satellite or one or more satellite-cell specific parameters associated with the second satellite may be received in a first system information block (SIB1). For example, after entering an idle mode on a first cell of a satellite, the UE 602 may receive an SIB1 from another cell associated with the same satellite. The SIB1 may include one or more standard parameters associated with the other cell or one or more satellite-cell specific parameters associated with the other cell as described herein. As another example, after entering an idle mode on a first cell of a first satellite, the UE 602 may receive an SIB 1 from a second cell associated with a second satellite. The SIB1 may include one or more standard parameters associated with the other cell or one or more satellite-cell specific parameters associated with the other cell as described herein. In some aspects, after cell selection or reselection, if the UE 602 determines that the cell belongs to a new satellite, then the UE receives or acquires the SIB 1.

In some aspects, when the indication, received by the UE 602 from the base station 606, via at least one satellite of the one or more satellites 604 (e.g., the second satellite), is received in an SIB1 including one or more standard parameters associated with the second satellite or one or more satellite-cell specific parameters associated with the second satellite, the one or more standard parameters or the one or more satellite-cell specific parameters may also include additional information indicating whether a current change or future change to beam pattern information (e.g., a beam center, a beam elevation angle, a beam polarization) associated with the second satellite or one or more other satellites located in area the includes the second satellite has occurred or is to occur, one or more beam pattern profile identifications of one or more beam pattern profiles associated with the second satellite or one or more other satellites associated with the area including the second satellite, an ephemeris associated with the second satellite or one or more other satellites, a list of one or more current or predicted future neighboring cells and/or satellites, whether a change has occurred to inter-frequency and inter-radio access technology (inter-RAT) cell reselection information, or the like.

The UE 602 may compare the received beam pattern information with beam pattern information stored in the UE 602 for determining whether the beam pattern information has changed. The beam pattern profile identification may indicate beam specific information including a beam diameter, a minimum elevation angle at an entry of the area and at an exits of the area, a beam center with respect to the satellite position, or the like. Based on the indication including the one or more standard parameters associated with the second satellite or the one or more satellite-cell specific parameters associated with the second satellite, the UE 602 may read the additional information contained in the SIB1. In some aspects, the UE 602 may also utilize a system value tag associated with at the second satellite and contained in the SIB1.

In some aspects, the SIB1 may also include group identifications identifying one or more different groups of satellites and/or beams that may be able to be configured to the UE 602. Each of the groups may include a list of satellite and beam identifications that share common access parameters and common configurations (e.g., a common beam pattern, a common paging). For example, the group identifications may include a first group indicating that a first beam of a first satellite and a second beam of the first satellite share common access parameters, a second group indicating that a third beam of the first satellite and a first beam of a second satellite share common access parameters, and a third group indicating that a second beam of the second satellite and a third beam of the second satellite share common access parameters. When receiving an SIB1, the cell and/or the satellite (e.g., the second satellite of the one or more satellites 604) may provide the access parameters by including only the group identifier associated with the cell and/or the satellite. The UE 602 may then determine the access parameters from a table matching the received group identifier with the associated access parameters identified in the table.

In some aspects, the indication, received by the UE 602 from the base station 606, via at least one satellite of the one or more satellites 604 (e.g., the second satellite), of one or more standard parameters associated with the second satellite or one or more satellite-cell specific parameters associated with the second satellite may be received in a master information block (MIB). For example, after entering an idle mode on a first cell of a satellite, the UE 602 may receive an MIB from another cell associated with the same satellite. The MIB may include one or more standard parameters associated with the other cell or one or more satellite-cell specific parameters associated with the other cell as described herein. As another example, after entering an idle mode on a first cell of a satellite, the UE 602 may receive an MIB from a second cell associated with a second satellite. The MIB may include one or more standard parameters associated with the other cell or one or more satellite-cell specific parameters associated with the other cell as described herein. In some aspects, after cell selection or reselection, if the UE 602 determines that the cell belongs to a new satellite, then the UE receives or acquires the MIB.

In some aspects, when the indication, received by the UE 602 from the base station 606, via at least one satellite of the one or more satellites 604 (e.g., the second satellite), is received in an MIB including one or more standard parameters associated with the second satellite or one or more satellite-cell specific parameters associated with the second satellite, the one or more standard parameters or the one or more satellite-cell specific parameters may also include additional information indicating whether a current change or future change to beam pattern information (e.g., a beam center, a beam elevation angle, a beam polarization) associated with the second satellite or one or more other satellites located in area the includes the second satellite has occurred or is to occur, one or more beam pattern profile identifications of one or more beam pattern profiles associated with the second satellite or one or more other satellites associated with the area including the second satellite, an ephemeris associated with the second satellite or one or more other satellites, a list of one or more current or predicted future neighboring cells and/or satellites, whether a change has occurred to inter-frequency and inter-radio access technology (inter-RAT) cell reselection information, or the like.

The UE 602 may compare the received beam pattern information with beam pattern information stored in the UE 602 for determining whether the beam pattern information has changed. The beam pattern profile identification may indicate beam specific information including a beam diameter, a minimum elevation angle at an entry of the area and at an exits of the area, a beam center with respect to the satellite position, or the like. Based on the indication including the one or more standard parameters associated with the second satellite or the one or more satellite-cell specific parameters associated with the second satellite, the UE 602 may read the additional information contained in the MIB. In some aspects, the UE 602 may also utilize a system value tag associated with at the second satellite and contained in the MIB.

In some aspects, the MIB may also include group identifications identifying one or more different groups of satellites and/or beams that may be able to be configured to the UE 602. Each of the groups may include a list of satellite and beam identifications that share common access parameters and common configurations (e.g., a common beam pattern, a common paging). For example, the group identifications may include a first group indicating that a first beam of a first satellite and a second beam of the first satellite share common access parameters, a second group indicating that a third beam of the first satellite and a first beam of a second satellite share common access parameters, and a third group indicating that a second beam of the second satellite and a third beam of the second satellite share common access parameters. When receiving an MIB, the cell and/or the satellite (e.g., the second satellite of the one or more satellites 604) may provide the access parameters by including only the group identifier associated with the cell and/or the satellite. The UE 602 may then determine the access parameters from a table matching the received group identifier with the associated access parameters identified in the table.

In some aspects, the MIB may only contain one spare bit to indicate one of one or more standard parameters or one or more satellite-cell specific parameters associated, one or more different beam patterns for current and/or future satellites, or a group identifier to which a cell belongs. For example, the intraFreqReselection field of the MIB may be repurposed to provide an indication using the one bit. The UE 602 may assume or may be configured so that the intraFreqReselection field is set to "allowed" or "not allowed" based on the cell type (e.g., LEO, GEO) so additional signaling in MIB for non-terrestrial networks may not be needed. In some aspects, when using the MIB to provide a group identifier, the MIB may be scrambled with different identifier groups for the UE to identify the group identifier that a cell belongs to. In some aspects, the UE 602 may receive the MIB use the MIB to identify whether to use the one or more standard parameters or the one or more satellite-cell specific parameters for accessing a cell. Subsequently, the UE 602 may receive an SIB1 for identifying either the one or more standard parameters or the one or more satellite-cell specific parameters for accessing the cell.

In some aspects, the indication, received by the UE 602 from the base station 606, via at least one satellite of the one or more satellites 604 (e.g., the second satellite), of one or more standard parameters associated with the second satellite or one or more satellite-cell specific parameters associated with the second satellite may be received in a radio resource control (RRC) message. For example, after entering an idle mode on a first cell of a satellite, the UE 602 may receive an RRC message (e.g., an RRCRelease message) from the first cell. The RRC message may include an indication that the UE is to select a cell and acquire one or more system information blocks (SIBs) including non-terrestrial network specific SIBs to acquire satellite and beam specific information. In some examples, the RRC message may include one or more standard parameters associated with the other cell or one or more satellite-cell specific parameters associated with the other cell as described herein. In some aspects, after cell selection or reselection, if the UE 602 determines that the cell belongs to a new satellite, then the UE receives or acquires the SIB1.

In some aspects, when the indication, received by the UE 602 from the base station 606, via at least one satellite of the one or more satellites 604 is received in an RRC message, the RRC message may also include additional information indicating whether a current change or future change to beam pattern information (e.g., a beam center, a beam elevation angle, a beam polarization) associated with the second satellite or one or more other satellites located in area the includes the second satellite has occurred or is to occur, one or more beam pattern profile identifications of one or more beam pattern profiles associated with the second satellite or one or more other satellites associated with the area including the second satellite, an ephemeris associated with the second satellite or one or more other satellites, a list of one or more current or predicted future neighboring cells and/or satellites, whether a change has occurred to interfrequency and inter-radio access technology (inter-RAT) cell reselection information, or the like. The UE 602 may compare the received beam pattern information with beam pattern information stored in the UE 602 for determining whether the beam pattern information has changed. The beam pattern profile identification may indicate beam specific information including a beam diameter, a minimum elevation angle at an entry of the area and at an exits of the area, a beam center with respect to the satellite position, or the like.

In some aspects, the RRC message may also include group identifications identifying one or more different groups of satellites and/or beams that may be able to be configured to the UE 602. Each of the groups may include a list of satellite and beam identifications that share common access parameters and common configurations (e.g., a common beam pattern, a common paging). For example, the group identifications may include a first group indicating that a first beam of a first satellite and a second beam of the first satellite share common access parameters, a second group indicating that a third beam of the first satellite and a first beam of a second satellite share common access parameters, and a third group indicating that a second beam of the second satellite and a third beam of the second satellite share common access parameters. When receiving an RRC message, the cell and/or the satellite (e.g., the second satellite of the one or more satellites 604) may provide the access parameters by including only the group identifier associated with the cell and/or the satellite. The UE 602 may then determine the access parameters from a table matching the received group identifier with the associated access parameters identified in the table.

In some aspects, the UE 602 may receive an indication from the base station 606, via at least one satellite of the one or more satellites 604 (e.g., the second satellite), of one or more standard parameters associated with the second satellite or one or more satellite-cell specific parameters associated with the second satellite based on a location of the UE 602. For example, a beam specific configuration and/or a satellite specific configuration as well as information described herein with respect to an SIB1, an MIB, and an RRC message may be associated with or fixed to a geographic terrestrial area. The base station 606 may determine the location of the UE 602, identify a fixed tracking area identification, a virtual cell identification, or a terrestrial fixed cell identification associated with the location of the UE 602, and provide the UE 602 with one or more standard parameters associated with the second satellite or one or more satellite-cell specific parameters associated with the second satellite based on the location of the UE 602. The location of the UE 602 may be served by a particular gateway at a particular time. In some aspects, if the UE transitions from a first cell to a second cell or from a first satellite to a second satellite and the UE 602 utilizes the same non-terrestrial area and a same gateway, the UE 602 may assume that SIBs are shared by the cells and/or the satellites. An SIB, an MIB, or dedicated RRC message signaling may provide the UE 602 with an indication of whether or not an SIB configuration is fixed to a geographical area or a tracking area. In some aspects, geographical specific SIB contents may be provided via dedicated RRC message signaling.

At 616, the UE 602 may determine whether to use the one or more standard parameters associated with the second satellite or the one or more satellite-cell specific parameters associated with the second satellite for accessing the second cell associated with the second satellite. The one or more standard parameters may be based on one or more standard characteristics common to a plurality of satellites including the second satellite. The one or more satellite-cell specific parameters may be based on a change to at least one standard characteristic of the one or more standard characteristics of the second satellite. In some aspects, the UE 602 may determine whether to use the one or more standard parameters associated with the second satellite or the one or more satellite-cell specific parameters associated with the second satellite based on whether a received indication associated with the second satellite contains either the one or more standard parameters or the one or more satellite-cell specific parameters.

At step 618, the UE 602 and base station 606 may then communicate (e.g., transmit and/or receive data, signaling, and/or traffic) through the second satellite. For instance, such "communication" may include the UE 602 monitoring or listening for transmissions from base station 606 (via the second satellite). Thus, the UE 602 need not transmit through the second satellite to "communicate".

In some examples, the UE may store a list of frequencies and PCIDs belonging to the selected satellite (e.g., the selected cell of the selected satellite). The UE 602 may measure and/or determine a frequency or PCID of the selected satellite and compare the measured and/or determined frequency or PCID with the list of frequencies and PCIDs to determine whether a match exists. If a match exists, the UE 602 may use previously stored standard parameters or previously stored satellite-cell specific parameters for accessing the second satellite. However, if a match does not exist, the UE 602 may read the indications (e.g., an SIB, MIB, or RRC message) to obtain the one or more standard parameters or the one or more satellite-cell specific parameters for accessing the second satellite.

In some aspects, the UE 602 may determine whether the UE is able to access the second cell based on either the one or more standard parameters of the one or more satellite-cell specific parameters. Additionally, or alternatively, the UE may determine whether the UE is able to access the second cell based on addition information and/or the group identification information described herein. In some aspects, for example, when the UE transition to an active mode on the second cell of the second satellite, the UE 602 may transmit a satellite-cell connection request to the second satellite of the one or more satellites 604 for accessing the second cell based determining that the UE is able to access the second cell.

Figure 7:
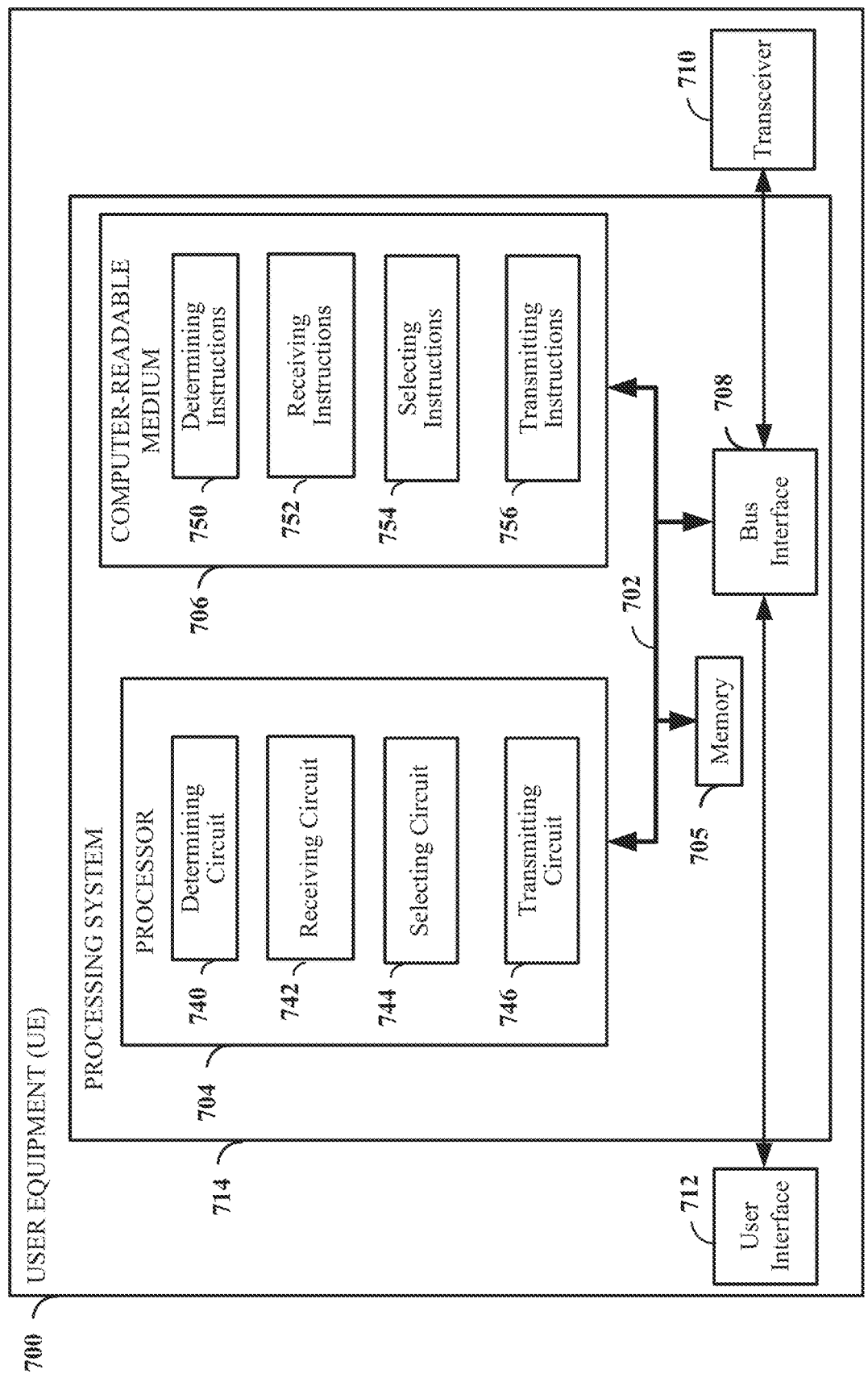
FIG. 7 is a block diagram illustrating an example of a hardware implementation for a user equipment (UE) employing a processing system according to some aspects.

FIG. 7 is a block diagram illustrating an example of a hardware implementation for a user equipment (UE) 700 employing a processing system 914. For example, the UE 700 may be any of the user equipment (UEs) or base stations (e.g., gNB or eNB) illustrated in any one or more of FIGS. 1-3, 5, and 6.

The UE 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 700 may be configured to perform any one or more of the functions described herein. That is, the processor 704, as utilized in a UE 700, may be used to implement any one or more of the processes described herein. The processor 704 may in some instances be implemented via a baseband or modem chip and in other implementations, the processor 704 may itself comprise a number of devices distinct and different from a baseband or modem chip (e.g., in such scenarios is may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), and computer-readable media (represented generally by the computer-readable storage medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium (e.g., air interface). A user interface 712 (e.g., keypad, display, speaker, microphone, joystick) may also be provided.

The processor 704 is responsible for managing the bus 702 and general processing, including the execution of software stored on the computer-readable storage medium 706. The software, when executed by the processor 704, causes the processing system 714 to perform the various functions described herein for any particular apparatus. The computer-readable storage medium 706 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 706.

The computer-readable storage medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 706 may reside in the processing system 714, external to the processing system 714, or distributed across multiple entities including the processing system 714. The computer-readable storage medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 704 may include circuitry configured for various functions. For example, the processor 704 may include determining circuitry 740 configured to determine that the user equipment (UE) has transitioned to an idle mode on a cell associated with a satellite. The determining circuitry 740 may also be configured to determine whether to use one or more standard parameters associated with a second satellite or one or more satellite-cell specific parameters associated with a second satellite for accessing a second cell associated with a second satellite. The determining circuitry 740 may further be configured to execute determining instructions 750 stored in the computer-readable storage medium 706 to implement any of the one or more of the functions described herein. The processor 704 may also include receiving circuitry 742 configured to receive an indication of one or more standard parameters associated with a second satellite or one or more satellite-cell specific parameters associated with a second satellite. The receiving circuitry 742 may further be configured to execute receiving instructions 752 stored in the computer-readable storage medium 706 to implement any of the one or more of the functions described herein.

The processor 704 may further include selecting circuitry 744 configured to select a second cell associated with a second satellite for wireless communication. The selecting circuitry 744 may further be configured to execute selecting instructions 754 stored in the computer-readable storage medium 706 to implement any of the one or more of the functions described herein. In addition, the processor 704 may include transmitting circuitry 746 configured to transmit a satellite-cell connection request for accessing a second cell associated with a second satellite after determining whether to use one or more standard parameters associated with the second satellite or one or more satellite-cell specific parameters associated with the first or second satellite. The transmitting circuitry 746 may further be configured to execute transmitting instructions 756 stored in the computer-readable storage medium 706 to implement any of the one or more of the functions described herein.

Figure 8:
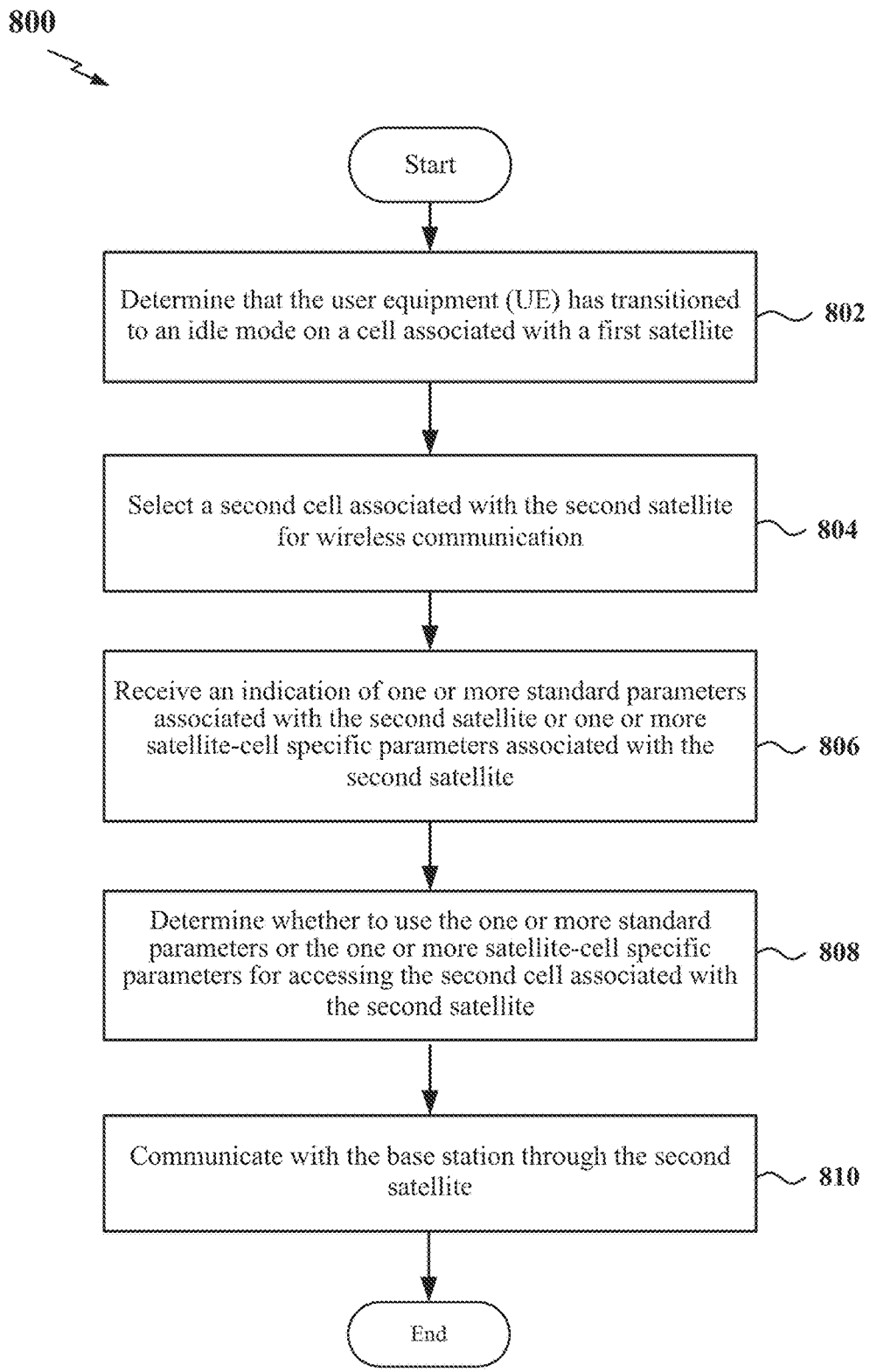
FIG. 8 is a flow chart of a method for updating satellite and beam specific information according to some aspects according to some aspects.

FIG. 8 is a flow chart 800 of a method for updating satellite and beam specific information according to some aspects. As described below, some or all illustrated features may be omitted in a particular implementation within the scope of the present disclosure, and some illustrated features may not be required for implementation of all aspects. In some examples, the method may be performed by the UE 700, as described above, and illustrated in FIG. 7, by a processor or processing system, or by any suitable means for carrying out the described functions. In one example, the UE 700 may store one or more standard parameters for accessing a cell associated with one or more satellites.

At block 802, the user equipment (UE) 700 may determine that the UE 700 has transitioned to an idle mode on a cell associated with a first satellite. For example, the UE may have been in an active mode on a first cell associated with the first satellite of the one or more satellites and transition to an idle mode after a period of minimal activity or no activity on the first cell. The transition to the idle mode may be due to receiving a release message (e.g., an RCCRelease message) instructing the UE to transition to the idle mode, a lack of use of the UE, a change in quality of one or more frequencies associated with the first cell, a change in terrestrial position of the UE, a passage of a period of time by a which the first satellite of the one or more satellites or the first cell may have moved further away from the terrestrial position of the UE, or the like. In response to transitioning to the idle mode on the first cell of the first satellite of the one or more satellites, the UE may initiate a cell reselection process. In some examples, the UE may have initially been powered on and initiate a cell selection process rather than a cell reselection process to select a cell and/or a satellite of the one or more satellites for wireless communication on the non-terrestrial network.

At block 804, the UE 700 may select a second cell associated with the second satellite for wireless communication. For example, the UE may receive and decode Primary Sync Signal (PSS) and Secondary Sync Signal (SSS) to the physical cell identification (PCID) for a plurality of cells and/or a plurality of satellites. The UE may choose the second cell associated with the second satellite having the best beam and decode content information of a physical broadcast channel (PBCH).

In some aspects, the UE may select the second cell of the second satellite of the one or more satellites based on quality of one or more parameters associated with the second cell. As another example, the UE may receive a plurality of indications of one or more standard parameters each associated with a cell of satellite of the one or more satellites or one or more satellite-cell specific parameters each associated with a cell of satellite of the one or more satellites. The UE may determine that one or more parameters associated with the second satellite (or a cell of the second satellite) contains optimal parameters (e.g., an optimal set of parameters relative to parameters contained in the remaining indications for a remaining set of cell and/or satellites). The UE may select the second cell of the second UE based on one or more optimal parameters contained in the received indication.

At block 806, the UE 700 may receive an indication of one or more standard parameters associated with a second satellite or one or more satellite-cell specific parameters associated with the second satellite. For example, the base station may have received an indication from the second satellite and determined that no changes to any of the one or more standard characteristics (e.g., scheduled parameters, pre-determined parameters) associated with the second satellite have occurred. In response to determining that no changes to any of the one or more standard characteristics associated with the second satellite have occurred, the base station may transmit, via at least one satellite of the one or more satellites (e.g., the second satellite) an indication of one or more standard parameters associated with the second satellite or a cell of the second satellite. The one or more standard parameters may include at least one of one or more satellite-cell access parameters, one or more satellite-cell configurations, or one or more sets of beam information, ephemeris information, or the like.

As another example, the base station may have received an indication from the second satellite and determined that at least one change to one or more of the standard characteristics (e.g., scheduled parameters, pre-determined parameters) associated with the second satellite has occurred. In response to determining that at least one change to one or more of the standard characteristics associated with the second satellite have occurred, the base station may transmit, via at least one satellite of the one or more satellites (e.g., the second satellite) an indication of one or more satellite-cell specific parameters associated with the second satellite or a cell of the second satellite.

In some aspects, the indication, received by the UE from the base station, via at least one satellite of the one or more satellites (e.g., the second satellite), of one or more standard parameters associated with the second satellite or one or more satellite-cell specific parameters associated with the second satellite may be received in a first system information block (SIB1). For example, after entering an idle mode on a first cell of a satellite, the UE may receive an SIB1 from another cell associated with the same satellite. The SIB1 may include one or more standard parameters associated with the other cell or one or more satellite-cell specific parameters associated with the other cell as described herein. As another example, after entering an idle mode on a first cell of a first satellite, the UE may receive an SIB1 from a second cell associated with a second satellite. The SIB1 may include one or more standard parameters associated with the other cell or one or more satellite-cell specific parameters associated with the other cell as described herein. In some aspects, after cell selection or reselection, if the UE determines that the cell belongs to a new satellite, then the UE receives or acquires the SIB1.

In some aspects, when the indication, received by the UE from the base station, via at least one satellite of the one or more satellites (e.g., the second satellite), is received in an SIB1 including one or more standard parameters associated with the second satellite or one or more satellite-cell specific parameters associated with the second satellite, the one or more standard parameters or the one or more satellite-cell specific parameters may also include additional information indicating whether a current change or future change to beam pattern information (e.g., a beam center, a beam elevation angle, a beam polarization) associated with the second satellite or one or more other satellites located in area the includes the second satellite has occurred or is to occur, one or more beam pattern profile identifications of one or more beam pattern profiles associated with the second satellite or one or more other satellites associated with the area including the second satellite, an ephemeris associated with the second satellite or one or more other satellites, a list of one or more current or predicted future neighboring cells and/or satellites, whether a change has occurred to inter-frequency and inter-radio access technology (inter-RAT) cell reselection information, or the like.

The UE may compare the received beam pattern information with beam pattern information stored in the UE for determining whether the beam pattern information has changed. The beam pattern profile identification may indicate beam specific information including a beam diameter, a minimum elevation angle at an entry of the area and at an exits of the area, a beam center with respect to the satellite position, or the like. Based on the indication including the one or more standard parameters associated with the second satellite or the one or more satellite-cell specific parameters associated with the second satellite, the UE may read the additional information contained in the SIB1. In some aspects, the UE may also utilize a system value tag associated with at the second satellite and contained in the SIB1.

In some aspects, the SIB1 may also include group identifications identifying one or more different groups of satellites and/or beams that may be able to be configured to the UE. Each of the groups may include a list of satellite and beam identifications that share common access parameters and common configurations (e.g., a common beam pattern, a common paging). For example, the group identifications may include a first group indicating that a first beam of a first satellite and a second beam of the first satellite share common access parameters, a second group indicating that a third beam of the first satellite and a first beam of a second satellite share common access parameters, and a third group indicating that a second beam of the second satellite and a third beam of the second satellite share common access parameters. When receiving an SIB1, the cell and/or the satellite (e.g., the second satellite of the one or more satellites) may provide the access parameters by including only the group identifier associated with the cell and/or the satellite. The UE may then determine the access parameters from a table matching the received group identifier with the associated access parameters identified in the table.

In some aspects, the indication, received by the UE from the base station, via at least one satellite of the one or more satellites (e.g., the second satellite), of one or more standard parameters associated with the second satellite or one or more satellite-cell specific parameters associated with the second satellite may be received in a master information block (MIB). For example, after entering an idle mode on a first cell of a satellite, the UE may receive an MIB from another cell associated with the same satellite. The MIB may include one or more standard parameters associated with the other cell or one or more satellite-cell specific parameters associated with the other cell as described herein. As another example, after entering an idle mode on a first cell of a satellite, the UE may receive an MIB from a second cell associated with a second satellite. The MIB may include one or more standard parameters associated with the other cell or one or more satellite-cell specific parameters associated with the other cell as described herein. In some aspects, after cell selection or reselection, if the UE determines that the cell belongs to a new satellite, then the UE receives or acquires the MIB.

In some aspects, when the indication, received by the UE from the base station, via at least one satellite of the one or more satellites (e.g., the second satellite), is received in an MIB including one or more standard parameters associated with the second satellite or one or more satellite-cell specific parameters associated with the second satellite, the one or more standard parameters or the one or more satellite-cell specific parameters may also include additional information indicating whether a current change or future change to beam pattern information (e.g., a beam center, a beam elevation angle, a beam polarization) associated with the second satellite or one or more other satellites located in area the includes the second satellite has occurred or is to occur, one or more beam pattern profile identifications of one or more beam pattern profiles associated with the second satellite or one or more other satellites associated with the area including the second satellite, an ephemeris associated with the second satellite or one or more other satellites, a list of one or more current or predicted future neighboring cells and/or satellites, whether a change has occurred to inter-frequency and inter-radio access technology (inter-RAT) cell reselection information, or the like.

The UE may compare the received beam pattern information with beam pattern information stored in the UE for determining whether the beam pattern information has changed. The beam pattern profile identification may indicate beam specific information including a beam diameter, a minimum elevation angle at an entry of the area and at an exits of the area, a beam center with respect to the satellite position, or the like. Based on the indication including the one or more standard parameters associated with the second satellite or the one or more satellite-cell specific parameters associated with the second satellite, the UE may read the additional information contained in the MIB. In some aspects, the UE may also utilize a system value tag associated with at the second satellite and contained in the MIB.

In some aspects, the MIB may also include group identifications identifying one or more different groups of satellites and/or beams that may be able to be configured to the UE. Each of the groups may include a list of satellite and beam identifications that share common access parameters and common configurations (e.g., a common beam pattern, a common paging). For example, the group identifications may include a first group indicating that a first beam of a first satellite and a second beam of the first satellite share common access parameters, a second group indicating that a third beam of the first satellite and a first beam of a second satellite share common access parameters, and a third group indicating that a second beam of the second satellite and a third beam of the second satellite share common access parameters. When receiving an MIB, the cell and/or the satellite (e.g., the second satellite of the one or more satellites) may provide the access parameters by including only the group identifier associated with the cell and/or the satellite. The UE may then determine the access parameters from a table matching the received group identifier with the associated access parameters identified in the table.

In some aspects, the MIB may only contain one spare bit to indicate one of one or more standard parameters or one or more satellite-cell specific parameters associated, one or more different beam patterns for current and/or future satellites, or a group identifier to which a cell belongs. For example, the intraFreqReselection field of the MIB may be repurposed to provide an indication using the one bit. The UE may assume or may be configured so that the intraFreqReselection field is set to "allowed" or "not allowed" based on the cell type (e.g., LEO, GEO) so additional signaling in MIB for non-terrestrial networks may not be needed. In some aspects, when using the MIB to provide a group identifier, the MIB may be scrambled with different identifier groups for the UE to identify the group identifier that a cell belongs to. In some aspects, the UE may receive the MIB use the MIB to identify whether to use the one or more standard parameters or the one or more satellite-cell specific parameters for accessing a cell. Subsequently, the UE may receive an SIB1 for identifying either the one or more standard parameters or the one or more satellite-cell specific parameters for accessing the cell.

In some aspects, the indication, received by the UE from the base station via at least one satellite of the one or more satellites (e.g., the second satellite), of one or more standard parameters associated with the second satellite or one or more satellite-cell specific parameters associated with the second satellite may be received in a radio resource control (RRC) message. For example, after entering an idle mode on a first cell of a satellite, the UE may receive an RRC message (e.g., an RRCRelease message) from the first cell. The RRC message may include an indication that the UE is to select a cell and acquire one or more system information blocks (SIBs) including non-terrestrial network specific SIBs to acquire satellite and beam specific information. In some examples, the RRC message may include one or more standard parameters associated with the other cell or one or more satellite-cell specific parameters associated with the other cell as described herein. In some aspects, after cell selection or reselection, if the UE determines that the cell belongs to a new satellite, then the UE receives or acquires the SIB1.

In some aspects, when the indication, received by the UE from the base station, via at least one satellite of the one or more satellites is received in an RRC message, the RRC message may also include additional information indicating whether a current change or future change to beam pattern information (e.g., a beam center, a beam elevation angle, a beam polarization) associated with the second satellite or one or more other satellites located in area the includes the second satellite has occurred or is to occur, one or more beam pattern profile identifications of one or more beam pattern profiles associated with the second satellite or one or more other satellites associated with the area including the second satellite, an ephemeris associated with the second satellite or one or more other satellites, a list of one or more current or predicted future neighboring cells and/or satellites, whether a change has occurred to inter-frequency and inter-radio access technology (inter-RAT) cell reselection information, or the like. The UE may compare the received beam pattern information with beam pattern information stored in the UE for determining whether the beam pattern information has changed. The beam pattern profile identification may indicate beam specific information including a beam diameter, a minimum elevation angle at an entry of the area and at an exits of the area, a beam center with respect to the satellite position, or the like.

In some aspects, the RRC message may also include group identifications identifying one or more different groups of satellites and/or beams that may be able to be configured to the UE. Each of the groups may include a list of satellite and beam identifications that share common access parameters and common configurations (e.g., a common beam pattern, a common paging). For example, the group identifications may include a first group indicating that a first beam of a first satellite and a second beam of the first satellite share common access parameters, a second group indicating that a third beam of the first satellite and a first beam of a second satellite share common access parameters, and a third group indicating that a second beam of the second satellite and a third beam of the second satellite share common access parameters. When receiving an RRC message, the cell and/or the satellite (e.g., the second satellite of the one or more satellites) may provide the access parameters by including only the group identifier associated with the cell and/or the satellite. The UE may then determine the access parameters from a table matching the received group identifier with the associated access parameters identified in the table.

In some aspects, the UE may receive an indication from the base station, via at least one satellite of the one or more satellites (e.g., the second satellite), of one or more standard parameters associated with the second satellite or one or more satellite-cell specific parameters associated with the second satellite based on a location of the UE. For example, a beam specific configuration and/or a satellite specific configuration as well as information described herein with respect to an SIB1, an MIB, and an RRC message may be associated with or fixed to a geographic terrestrial area. The base station may determine the location of the UE, identify a fixed tracking area identification, a virtual cell identification, or a terrestrial fixed cell identification associated with the location of the UE, and provide the UE with one or more standard parameters associated with the second satellite or one or more satellite-cell specific parameters associated with the second satellite based on the location of the UE. The location of the UE may be served by a particular gateway at a particular time. In some aspects, if the UE transitions from a first cell to a second cell or from a first satellite to a second satellite and the UE utilizes the same non-terrestrial area and a same gateway, the UE may assume that SIB s are shared by the cells and/or the satellites. An SIB, an MIB, or dedicated RRC message signaling may provide the UE with an indication of whether or not an SIB configuration is fixed to a geographical area or a tracking area. In some aspects, geographical specific SIB contents may be provided via dedicated RRC message signaling.

At block 808, the UE 700 may determine whether to use either the one or more standard parameters associated with the second satellite or the one or more satellite-cell specific parameters associated with the second satellite for accessing the second associated with the second satellite. The one or more standard parameters may be based on one or more standard characteristics common to a plurality of satellites including the second satellite.

The one or more satellite-cell specific parameters may be based on a change to at least one standard characteristic of the one or more standard characteristics of the second satellite. In some aspects, the UE may determine whether to use the one or more standard parameters associated with the second satellite or the one or more satellite-cell specific parameters associated with the second satellite based on whether a received indication associated with the second satellite contains either the one or more standard parameters or the one or more satellite-cell specific parameters. In one instance, the one or more satellite-cell specific parameters are used or selected if it is determined that a change to at least one standard characteristic of the one or more standard characteristics of the first satellite has occurred.

At block 810, the UE 700 may communicate with the base station through the second satellite, while utilizing the selected one or more standard parameters or the one or more satellite-cell specific parameters.

In some examples, the UE may store a list of frequencies and PCIDs belonging to the selected satellite (e.g., the selected cell of the selected satellite). The UE may measure and/or determine a frequency or PCID of the selected satellite and compare the measured and/or determined frequency or PCID with the list of frequencies and PCIDs to determine whether a match exists. If a match exists, the UE may use previously stored standard parameters or previously stored satellite-cell specific parameters for accessing the second satellite. However, if a match does not exist, the UE may read the indications (e.g., an SIB, MIB, or RRC message) to obtain the one or more standard parameters or the one or more satellite-cell specific parameters for accessing the second satellite.

In some aspects, the UE may determine whether the UE is able to access the second cell based on either the one or more standard parameters of the one or more satellite-cell specific parameters. Additionally, or alternatively, the UE may determine whether the UE is able to access the second cell based on addition information and/or the group identification information described herein. In some aspects, for example, when the UE transition to an active mode on the second cell of the second satellite, the UE may transmit a satellite-cell connection request to the second satellite of the one or more satellites for accessing the second cell based determining that the UE is able to access the second cell.

Figure 9:
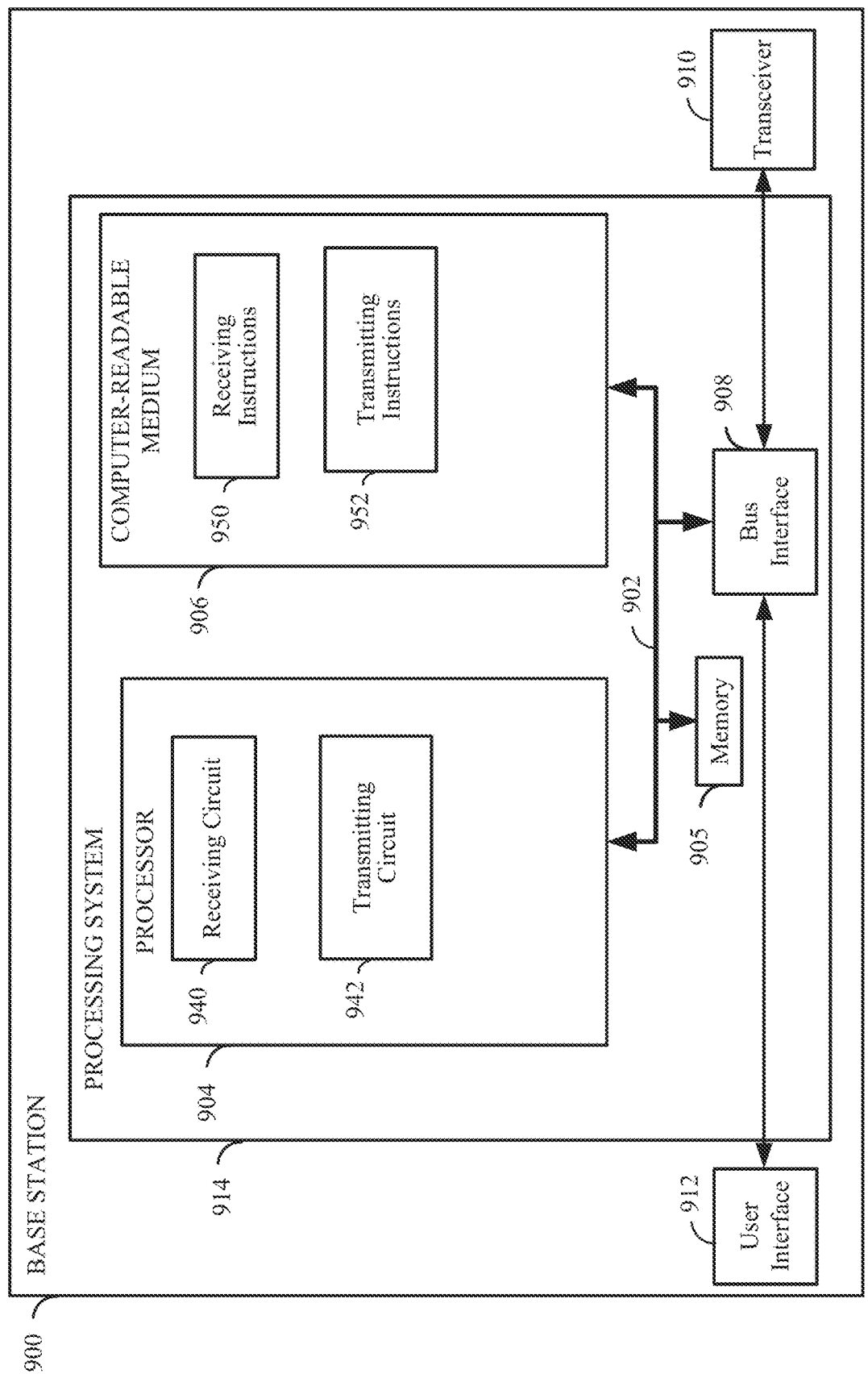
FIG. 9 is a block diagram illustrating an example of a hardware implementation for a base station employing a processing system according to some aspects.

FIG. 9 is a block diagram illustrating an example of a hardware implementation for a base station 900 employing a processing system 914 according to some aspects. For example, the base station 900 may correspond to any of the devices or systems shown and described herein in any one or more of FIGS. 1-3, 5, and 6.

In accordance with various aspects of the disclosure, an element, or any portion of an element, or any combination of elements may be implemented with a processing system 914 that includes one or more processors 904. The processing system 914 may be substantially the same as the processing system 714 illustrated in FIG. 7, including a bus interface 908, a bus 902, a processor 904, and a computer-readable storage medium 906. Furthermore, the base station 900 may include a user interface 912 and a transceiver 910 substantially similar to those described above in FIG. 9. That is, the processor 904, as utilized in the base station 900, may be used to implement any one or more of the processes described herein.

In some aspects of the disclosure, the processor 904 may include circuitry configured for various functions. For example, the processor 904 may include receiving circuitry 940 configured to receive an indication from a second satellite indicating whether one or more standard characteristics associated with a second satellite have changed. The receiving circuitry 940 may also be configured to execute receiving instructions 950 stored in the computer-readable storage medium 906 to implement any of the one or more of the functions described herein.

The processor 904 may also include transmitting circuitry 942 configured to transmit an indication to a user equipment (UE), via a second satellite, indicating one of one or more standard parameters associated with the second satellite or one or more satellite-cell specific parameters associated with the second satellite. The transmitting circuitry 942 may further be configured to execute transmitting instructions 952 stored in the computer-readable storage medium 906 to implement any of the one or more of the functions described herein.

Figure 10:
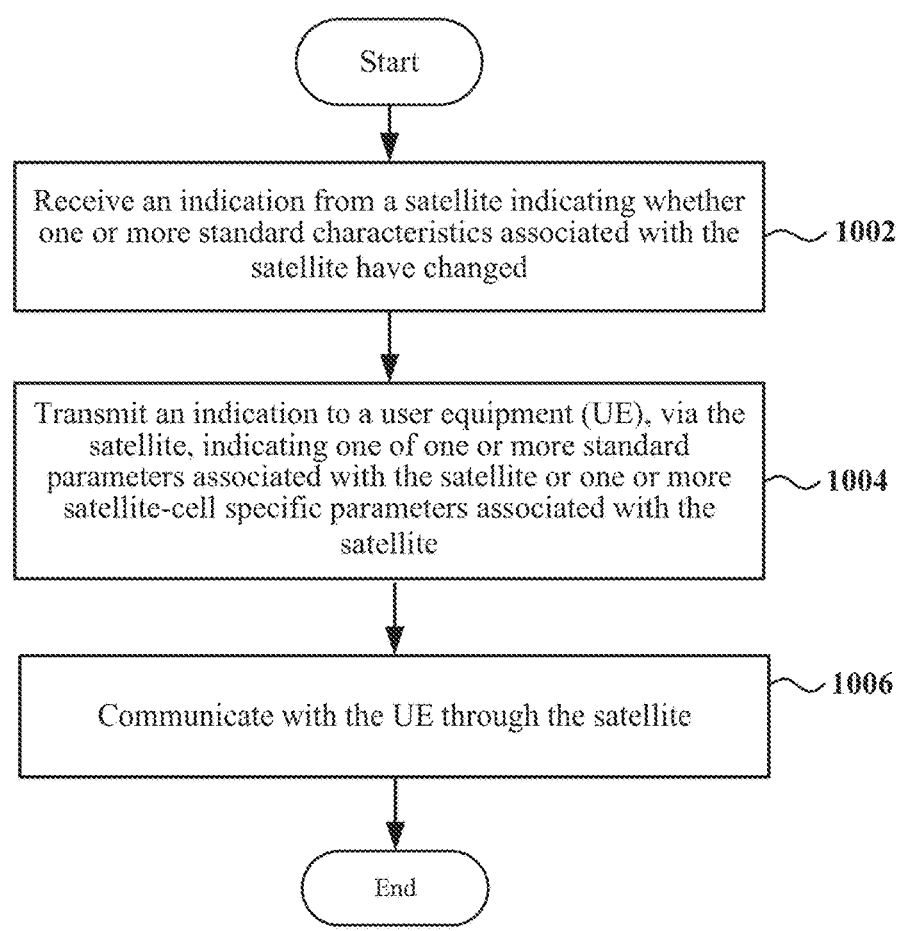
FIG. 10 is a flow chart of a method for updating satellite and beam specific information according to some aspects according to some aspects.

FIG. 10 is a flow chart 1000 of a method for selecting and utilizing carrier aggregation configurations for sidelink communications according to some aspects. As described below, some or all illustrated features may be omitted in a particular implementation within the scope of the present disclosure, and some illustrated features may not be required for implementation of all aspects. In some examples, the method may be performed by the base station 900, as described herein, and illustrated in FIG. 9, by a processor or processing system, or by any suitable means for carrying out the described functions.

At block 1002, the base station 900 may receive an indication from a satellite indicating whether one or more standard characteristics associated with the satellite have changed. For example, base station may determine and/or receive an indication from the second satellite for determining whether at least one of a location of the second satellite has change (e.g., for a scheduled or predicted position), an earth area coverage associated with the second satellite has changed (e.g., from a scheduled or predicted earth area coverage), a base station associated with the second satellite has changed, a feeder link providing communication between the second satellite and an associated base station has changed, an access and mobility management function (AMF) associated with the second satellite has change, a feeder link providing communication between the second satellite and a mobility management function has changed.

At block 1004, the base station 900 may transmit an indication to a user equipment (UE), via the satellite, indicating one of one or more standard parameters associated with the satellite or one or more satellite-cell specific parameters associated with the satellite. For example, the base station may have received an indication from a second satellite and determined that no changes to any of the one or more standard characteristics (e.g., scheduled parameters, pre-determined parameters) associated with the second satellite have occurred. In response to determining that no changes to any of the one or more standard characteristics associated with the second satellite have occurred, the base station may transmit, via at least one satellite of the one or more satellites (e.g., the second satellite) an indication of one or more standard parameters associated with the second satellite or a cell of the second satellite. The one or more standard parameters may include at least one of one or more satellite-cell access parameters, one or more satellite-cell configurations, or one or more sets of beam information, ephemeris information, or the like.

At block 1006, the base station 900 may communicate with the UE through the second satellite, while utilizing the selected one or more standard parameters or the one or more satellite-cell specific parameters.

As another example, the base station may have received an indication from the second satellite and determined that at least one change to one or more of the standard characteristics (e.g., scheduled parameters, pre-determined parameters) associated with the second satellite has occurred. In response to determining that at least one change to one or more of the standard characteristics associated with the second satellite have occurred, the base station may transmit, via at least one satellite of the one or more satellites (e.g., the second satellite) an indication of one or more satellite-cell specific parameters associated with the second satellite or a cell of the second satellite.

In some aspects, the indication, transmitted to the UE from the base station, via at least one satellite of the one or more satellites (e.g., the second satellite), of one or more standard parameters associated with the second satellite or one or more satellite-cell specific parameters associated with the second satellite may be transmitted in a first system information block (SIB1). For example, after entering an idle mode on a first cell of a satellite, the UE may receive an SIB1 from the base station via another cell associated with the same satellite. The SIB1 may include one or more standard parameters associated with the other cell or one or more satellite-cell specific parameters associated with the other cell as described herein. As another example, after entering an idle mode on a first cell of a first satellite, the UE may receive an SIB1 from the base station via a second cell associated with a second satellite. The SIB1 may include one or more standard parameters associated with the other cell or one or more satellite-cell specific parameters associated with the other cell as described herein. In some aspects, after cell selection or reselection, if the UE determines that the cell belongs to a new satellite, then the UE receives or acquires the SIB1.

In some aspects, when the indication, transmitted to the UE from the base station, via at least one satellite of the one or more satellites (e.g., the second satellite), is transmitted in an SIB1 including one or more standard parameters associated with the second satellite or one or more satellite-cell specific parameters associated with the second satellite, the one or more standard parameters or the one or more satellite-cell specific parameters may also include additional information indicating whether a current change or future change to beam pattern information (e.g., a beam center, a beam elevation angle, a beam polarization) associated with the second satellite or one or more other satellites located in area the includes the second satellite has occurred or is to occur, one or more beam pattern profile identifications of one or more beam pattern profiles associated with the second satellite or one or more other satellites associated with the area including the second satellite, an ephemeris associated with the second satellite or one or more other satellites, a list of one or more current or predicted future neighboring cells and/or satellites, whether a change has occurred to inter-frequency and inter-radio access technology (inter-RAT) cell reselection information, or the like.

The UE may compare the received beam pattern information with beam pattern information stored in the UE for determining whether the beam pattern information has changed. The beam pattern profile identification may indicate beam specific information including a beam diameter, a minimum elevation angle at an entry of the area and at an exits of the area, a beam center with respect to the satellite position, or the like. Based on the indication including the one or more standard parameters associated with the second satellite or the one or more satellite-cell specific parameters associated with the second satellite, the UE may read the additional information contained in the SIB1. In some aspects, the UE may also utilize a system value tag associated with at the second satellite and contained in the SIB1.

In some aspects, the SIB1 may also include group identifications identifying one or more different groups of satellites and/or beams that may be able to be configured to the UE. Each of the groups may include a list of satellite and beam identifications that share common access parameters and common configurations (e.g., a common beam pattern, a common paging). For example, the group identifications may include a first group indicating that a first beam of a first satellite and a second beam of the first satellite share common access parameters, a second group indicating that a third beam of the first satellite and a first beam of a second satellite share common access parameters, and a third group indicating that a second beam of the second satellite and a third beam of the second satellite share common access parameters. When receiving an SIB1, the cell and/or the satellite (e.g., the second satellite of the one or more satellites) may provide the access parameters by including only the group identifier associated with the cell and/or the satellite. The UE may then determine the access parameters from a table matching the received group identifier with the associated access parameters identified in the table.

In some aspects, the indication, transmitted to the UE from the base station, via at least one satellite of the one or more satellites (e.g., the second satellite), of one or more standard parameters associated with the second satellite or one or more satellite-cell specific parameters associated with the second satellite may be received in a master information block (MIB). For example, after entering an idle mode on a first cell of a satellite, the UE may receive an MIB from the base station via another cell associated with the same satellite. The MIB may include one or more standard parameters associated with the other cell or one or more satellite-cell specific parameters associated with the other cell as described herein. As another example, after entering an idle mode on a first cell of a first satellite, the UE may receive an MIB from the base station via a second cell associated with a second satellite. The MIB may include one or more standard parameters associated with the other cell or one or more satellite-cell specific parameters associated with the other cell as described herein. In some aspects, after cell selection or reselection, if the UE determines that the cell belongs to a new satellite, then the UE receives or acquires the MIB.

In some aspects, when the indication, transmitted to the UE from the base station, via at least one satellite of the one or more satellites (e.g., the second satellite), is transmitted in an MIB including one or more standard parameters associated with the second satellite or one or more satellite-cell specific parameters associated with the second satellite, the one or more standard parameters or the one or more satellite-cell specific parameters may also include additional information indicating whether a current change or future change to beam pattern information (e.g., a beam center, a beam elevation angle, a beam polarization) associated with the second satellite or one or more other satellites located in area the includes the second satellite has occurred or is to occur, one or more beam pattern profile identifications of one or more beam pattern profiles associated with the second satellite or one or more other satellites associated with the area including the second satellite, an ephemeris associated with the second satellite or one or more other satellites, a list of one or more current or predicted future neighboring cells and/or satellites, whether a change has occurred to inter-frequency and inter-radio access technology (inter-RAT) cell reselection information, or the like.

The UE may compare the received beam pattern information with beam pattern information stored in the UE for determining whether the beam pattern information has changed. The beam pattern profile identification may indicate beam specific information including a beam diameter, a minimum elevation angle at an entry of the area and at an exits of the area, a beam center with respect to the satellite position, or the like. Based on the indication including the one or more standard parameters associated with the second satellite or the one or more satellite-cell specific parameters associated with the second satellite, the UE may read the additional information contained in the MIB. In some aspects, the UE may also utilize a system value tag associated with at the second satellite and contained in the MIB.

In some aspects, the MIB may also include group identifications identifying one or more different groups of satellites and/or beams that may be able to be configured to the UE. Each of the groups may include a list of satellite and beam identifications that share common access parameters and common configurations (e.g., a common beam pattern, a common paging). For example, the group identifications may include a first group indicating that a first beam of a first satellite and a second beam of the first satellite share common access parameters, a second group indicating that a third beam of the first satellite and a first beam of a second satellite share common access parameters, and a third group indicating that a second beam of the second satellite and a third beam of the second satellite share common access parameters. When receiving an MIB, the cell and/or the satellite (e.g., the second satellite of the one or more satellites) may provide the access parameters by including only the group identifier associated with the cell and/or the satellite. The UE may then determine the access parameters from a table matching the received group identifier with the associated access parameters identified in the table.

In some aspects, the MIB may only contain one spare bit to indicate one of one or more standard parameters or one or more satellite-cell specific parameters associated, one or more different beam patterns for current and/or future satellites, or a group identifier to which a cell belongs. For example, the intraFreqReselection field of the MIB may be repurposed to provide an indication using the one bit. The UE may assume or may be configured so that the intraFreqReselection field is set to "allowed" or "not allowed" based on the cell type (e.g., LEO, GEO) so additional signaling in MIB for non-terrestrial networks may not be needed. In some aspects, when using the MIB to provide a group identifier, the MIB may be scrambled with different identifier groups for the UE to identify the group identifier that a cell belongs to. In some aspects, the UE may receive the MIB use the MIB to identify whether to use the one or more standard parameters or the one or more satellite-cell specific parameters for accessing a cell. Secondly, the UE may receive an SIB1 for identifying either the one or more standard parameters or the one or more satellite-cell specific parameters for accessing the cell.

In some aspects, the indication, transmitted to the UE from the base station, via at least one satellite of the one or more satellites (e.g., the second satellite), of one or more standard parameters associated with the second satellite or one or more satellite-cell specific parameters associated with the second satellite may be transmitted in a radio resource control (RRC) message. For example, after entering an idle mode on a first cell of a satellite, the UE may receive an RRC message (e.g., an RRCRelease message) from the base station via the first cell. The RRC message may include an indication that the UE is to select a cell and acquire one or more system information blocks (SIB s) including non-terrestrial network specific SIBs to acquire satellite and beam specific information. In some examples, the RRC message may include one or more standard parameters associated with the other cell or one or more satellite-cell specific parameters associated with the other cell as described herein. In some aspects, after cell selection or reselection, if the UE determines that the cell belongs to a new satellite, then the UE receives or acquires the SIB1.

In some aspects, when the indication, transmitted to the UE from the base station, via at least one satellite of the one or more satellites is received in an RRC message, the RRC message may also include additional information indicating whether a current change or future change to beam pattern information (e.g., a beam center, a beam elevation angle, a beam polarization) associated with the second satellite or one or more other satellites located in area the includes the second satellite has occurred or is to occur, one or more beam pattern profile identifications of one or more beam pattern profiles associated with the second satellite or one or more other satellites associated with the area including the second satellite, an ephemeris associated with the second satellite or one or more satellites, a list of one or more current or predicted future neighboring cells and/or satellites, whether a change has occurred to inter-frequency and inter-radio access technology (inter-RAT) cell reselection information, or the like. The UE may compare the received beam pattern information with beam pattern information stored in the UE for determining whether the beam pattern information has changed. The beam pattern profile identification may indicate beam specific information including a beam diameter, a minimum elevation angle at an entry of the area and at an exits of the area, a beam center with respect to the satellite position, or the like.

In some aspects, the RRC message may also include group identifications identifying one or more different groups of satellites and/or beams that may be able to be configured to the UE. Each of the groups may include a list of satellite and beam identifications that share common access parameters and common configurations (e.g., a common beam pattern, a common paging). For example, the group identifications may include a first group indicating that a first beam of a first satellite and a second beam of the first satellite share common access parameters, a second group indicating that a third beam of the first satellite and a first beam of a second satellite share common access parameters, and a third group indicating that a second beam of the second satellite and a third beam of the second satellite share common access parameters. When receiving an RRC message, the cell and/or the satellite (e.g., the second satellite of the one or more satellites) may provide the access parameters by including only the group identifier associated with the cell and/or the satellite. The UE may then determine the access parameters from a table matching the received group identifier with the associated access parameters identified in the table.

In some aspects, the UE may receive an indication from the base station, via at least one satellite of the one or more satellites (e.g., the second satellite), of one or more standard parameters associated with the second satellite or one or more satellite-cell specific parameters associated with the second satellite based on a location of the UE. For example, a beam specific configuration and/or a satellite specific configuration as well as information described herein with respect to an SIB1, an MIB, and an RRC message may be associated with or fixed to a geographic terrestrial area. The base station may determine the location of the UE, identify a fixed tracking area identification, a virtual cell identification, or a terrestrial fixed cell identification associated with the location of the UE, and provide the UE with one or more standard parameters associated with the second satellite or one or more satellite-cell specific parameters associated with the second satellite based on the location of the UE. The location of the UE may be served by a particular gateway at a particular time. In some aspects, if the UE transitions from a first cell to a second cell or from a first satellite to a second satellite and the UE utilizes the same non-terrestrial area and a same gateway, the UE may assume that SIB s are shared by the cells and/or the satellites. An SIB, an MIB, or dedicated RRC message signaling may provide the UE with an indication of whether or not an SIB configuration is fixed to a geographical area or a tracking area. In some aspects, geographical specific SIB contents may be provided via dedicated RRC message signaling.

The following provides an overview of aspects of the present disclosure:

Aspect 1: A method for wireless communication at user equipment (UE) in a non-terrestrial network, comprising: storing one or more standard parameters for accessing a cell associated with one or more satellites; selecting a first cell associated with a first satellite for wireless communication in the non-terrestrial network; determining whether to use either the one or more standard parameters or one or more satellite-cell specific parameters for accessing the first cell, wherein the one or more standard parameters are based on one or more standard characteristics common to a plurality of satellites including the first satellite, and wherein the one or more satellite-cell specific parameters are used if it is determined that a change to at least one standard characteristic of the one or more standard characteristics of the first satellite has occurred; and communicating with a base station via the first satellite.

Aspect 2: The method of aspect 1, further comprising: receiving a first system information block (SIB1) identifying the one or more standard parameters or the one or more satellite-cell specific parameters in response to determining to transition from a second cell associated with a second satellite; and wherein determining whether to use the one or more standard parameters or the one or more satellite-cell specific parameters for accessing the first cell is based on whether the first system information block identifies the one or more standard parameters or the one or more satellite-cell specific parameters are usable.

Aspect 3: The method of any of aspects 1 through 2, further comprising: receiving a first system information block identifying the one or more satellite-cell specific parameters for accessing the first cell; and wherein determining whether to use the one or more standard parameters or the one or more satellite-cell specific parameters for accessing the first cell comprises: identifying a list of one or more frequencies and one or more physical cell identifications (PCIDs) associated with the first satellite, and identifying whether a frequency or a physical cell identification for accessing the first cell is included in the list.

Aspect 4: The method of any of aspects 1 through 3, wherein determining whether to use the one or more standard parameters or the one or more satellite-cell specific parameters for accessing the first cell comprises: receiving a master information block (MIB) identifying whether the one or more standard parameters or the one or more satellite-cell specific parameters are usable.

Aspect 5: The method of any of aspects 1 through 4, wherein the master information block identifies the one or more standard parameters or the one or more satellite-cell specific parameters in a bit field utilizing a signal bit.

Aspect 6: The method of any of aspects 1 through 5, further comprising: receiving a radio resource control (RRC) message indicating that the UE is to release from an active mode into an idle mode on a second cell before selecting the first cell.

Aspect 7: The method of any of aspects 1 through 6, wherein the radio resource control message further includes at least one change in a priority for one or more satellites including the first satellite or one or more cells including the first cell and the second cell, and the radio resource control message further indicates that the UE is to: release from the active mode into the idle mode on a second cell before selecting the first cell, and select the first cell associated with the first satellite for the wireless communication in the non-terrestrial network based on the at least one change in priority.

Aspect 8: The method of any of aspects 1 through 6, wherein the radio resource control message further comprises a group identification identifying one or more satellite-cell groups for initiating reselection by the UE, wherein the one or more satellite-cell groups each include a list of one or more satellites and one or more beam identifications that share at least one of one or more same access parameters or one or more same beam configurations, and wherein the radio resource control message indicates that the UE is to release from the active mode into the idle mode on the second cell before selecting the first cell, and select the first cell associated with the first satellite for the wireless communication in the non-terrestrial network based on the group identification.

Aspect 9: The method of any of aspects 1 through 6, wherein the radio resource control message further comprises a list change indication of at least one change to a list of neighbor cells, an inter-frequency list, or an inter-radio access technology (inter-RAT) list, reselection information on a list of neighbor cells, reselection information on an inter-frequency list, or reselection information on an inter-radio access technology (inter-RAT) list, and wherein the radio resource control message indicates that the UE is to release from the active mode into the idle mode on the second cell before selecting the first cell, and select the first cell associated with the first satellite for the wireless communication in the non-terrestrial network based on the list change indication.

Aspect 10: The method of any of aspects 1 through 9, wherein the one or more standard parameters comprise at least one of one or more satellite-cell access parameters, one or more satellite-cell configurations, one or more sets of beam information, or ephemeris information or common parameters for one or more satellites or cells.

Aspect 11: The method of any of aspects 1 through 9, wherein the one or more standard characteristics comprise at least one of a location of the first satellite, an earth area coverage associated with the first satellite, an indication of the base station associated with the first satellite, an indication of a feeder link providing communication between the first satellite and the base station, an indication of an access and mobility management function (AMF) associated with the first satellite, or an indication of a feeder link providing communication between the first satellite and an access and mobility management function.

Aspect 12: The method of any of aspects 1 through 11, further comprising: receiving a first system information block (SIB1) identifying the one or more standard parameters or the one or more satellite-cell specific parameters; and wherein determining whether to use the one or more standard parameters or the one or more satellite-cell specific parameters for accessing the first cell is based on whether the first system information block identifies the one or more standard parameters or the one or more satellite-cell specific parameters.

Aspect 13: The method of any of aspects 1 through 12, wherein the first system information block further comprises a first indication of at least one of: a current change or future change to beam pattern information associated with one or more other satellites located in area the includes the first satellite, or one or more beam pattern profile identifications of one or more beam pattern profiles associated with one or more other satellites associated with the area including the first satellite.

Aspect 14: The method of any of aspects 1 through 12, wherein the first system information block further comprises a second indication of at least one of: an ephemeris associated with the first satellite, beam pattern information associated with the first satellite, a list of one or more neighbor cells, or inter-frequency and inter-radio access technology (inter-RAT) cell reselection information.

Aspect 15: The method of any of aspects 1 through 12, wherein the first system information block further comprises a system value tag associated with at least the first satellite.

Aspect 16: The method of any of aspects 1 through 12, wherein the first system information block further comprises a group identification identifying one or more satellite-cell groups for initiating reselection by the UE, wherein the one or more satellite-cell groups each include a list of one or more satellites and one or more beam identifications that share at least one of one or more same access parameters or one or more same beam configurations.

Aspect 17: The method of claim any of aspects 1 through 16, further comprising: receiving a master information block identifying whether to use the one or more standard parameters or the one or more satellite-cell specific parameters for accessing the first cell, and receiving a first system information block identifying either the one or more standard parameters or the one or more satellite-cell specific parameters for accessing the first cell; and wherein determining whether to use the one or more standard parameters or the one or more satellite-cell specific parameters for accessing the first cell is based on whether the first system information block identifies the one or more standard parameters or the one or more satellite-cell specific parameters.

Aspect 18: The method of claim any of aspects 1 through 17, further comprising: identifying a release from an active mode into an idle mode on a second cell before selecting the first cell, and receiving a radio resource control (RRC) message identifying the one or more standard parameters or the one or more satellite-cell specific parameters; and wherein: determining whether to use the one or more standard parameters or the one or more satellite-cell specific parameters for accessing the first cell comprises: determining whether to use the one or more standard parameters or the one or more satellite-cell specific parameters for accessing the first cell based on whether the radio resource control message identifies the one or more standard parameters or the one or more satellite-cell specific.

Aspect 19: The method of any of aspects 1 through 18, wherein at least one of the one or more standard parameters or one or more satellite-cell specific parameters are associated with a fixed geographic area.

Aspect 20: The method of claim any of aspects 1 through 19, wherein the fixed geographic area is determined based on one of fixed tracking area identification, a virtual cell identification, or fixed cell identification.

Aspect 21: A user equipment (UE) for wireless communication in a non-terrestrial network (NTN), comprising: a wireless transceiver; a memory; and a processor communicatively coupled to the wireless transceiver and the memory, wherein the processor and the memory are configured to: store one or more standard parameters for accessing a cell associated with one or more satellites; select a first cell associated with a first satellite for wireless communication in the non-terrestrial network; determine whether to use either the one or more standard parameters or one or more satellite-cell specific parameters for accessing the first cell, wherein the one or more standard parameters are based on one or more standard characteristics common to a plurality of satellites including the first satellite, and wherein the one or more satellite-cell specific parameters are used if it is determined that a change to at least one standard characteristic of the one or more standard characteristics of the first satellite has occurred; and communicate with a base station via the first satellite.

Aspect 22: A method for wireless communication at a base station in communication with a user equipment (UE), via one or more satellites, in a non-terrestrial network, comprising: transmitting, via a first cell associated with a first satellite of the one or more satellites, one or more standard parameters or one or more satellite-cell specific parameters for accessing the first cell, wherein the one or more standard parameters are based on one or more standard characteristics common to a plurality of satellites including the second satellite, and wherein the one or more satellite-cell specific parameters are based on a change to at least one standard characteristic of the one or more standard characteristics of the second satellite; receiving a satellite-cell connection request from the UE, via the first satellite, for accessing the first cell after transmitting the one or more standard parameters or the one or more satellite-cell specific parameters; and communicating with the UE via the first satellite.

Aspect 23: The method of aspect 22, further comprising: transmitting a radio resource control (RRC) message indicating that the UE is to release from an active mode into an idle mode on a second cell before selecting the first cell.

Aspect 24: The method of any of aspects 22 through 23, wherein the radio resource control message further includes at least one change in a priority to one or more satellites including the first satellite or one or more cells including the first cell and the second cell, and wherein the radio resource control message indicates that the UE is to release from the active mode into the idle mode on a second cell before selecting the first cell, and select the first cell associated with the first satellite for the wireless communication in the non-terrestrial network based on the at least one change in priority.

Aspect 25: The method of any of aspects 22 through 23, wherein the radio resource control message further comprises a list change indication of at least one change to a list of neighbor cells, an inter-frequency list, or an inter-radio access technology (inter-RAT) list, reselection information on a list of neighbor cells, reselection information on an inter-frequency list, or reselection information on an inter-radio access technology (inter-RAT) list, and wherein the radio resource control message indicates that the UE is to release from the active mode into the idle mode on the second cell before selecting the first cell, and select the first cell associated with the first satellite for the wireless communication in the non-terrestrial network based on the list change indication.

Aspect 26: The method of any of aspects 22 through 25, wherein receiving the satellite-cell connection request from the UE for accessing the first cell after determining whether to use the one or more standard parameters or the one or more satellite-cell specific parameters comprises: receiving the satellite-cell connection request from the UE for accessing the first cell based on the one or more standard parameters when transmitting the one or more standard parameters for accessing the first cell, and receiving the satellite-cell connection request from the UE for accessing the first cell based on the one or more satellite-cell specific parameters when transmitting the one or more satellite-cell specific parameters for accessing the first cell.

Aspect 27: The method of any of aspects 22 through 26, wherein the one or more standard characteristics comprise at least one of a location of the first satellite, an earth area coverage associated with the first satellite, an indication of a base station associated with the first satellite, an indication of a feeder link providing communication between the first satellite and a base station, an indication of an access and mobility management function (AMF) associated with the first satellite, or an indication of a feeder link providing communication between the first satellite and an access and mobility management function.

Aspect 28: The method of any of aspects 22 through 27, wherein transmitting, via the first cell associated with the first satellite of the one or more satellites, the one or more standard parameters or the one or more satellite-cell specific parameters for accessing the first cell comprises: transmitting a first system information block (SIB1) identifying the one or more standard parameters or the one or more satellite-cell specific parameters.

Aspect 29: The method of any of aspects 22 through 28, wherein the first system information block further comprises a first indication of at least one of: a current change or future change to beam pattern information associated with one or more other satellites located in area the includes the first satellite, or one or more beam pattern profile identifications of one or more beam pattern profiles associated with one or more other satellites associated with the area including the first satellite.

Aspect 30: A base station in a non-terrestrial network (NTN), comprising: a wireless transceiver; a memory; and a processor communicatively coupled to the wireless transceiver and the memory, wherein the processor and the memory are configured to: transmit, via a first cell associated with a first satellite of the one or more satellites, one or more standard parameters or one or more satellite-cell specific parameters for accessing the first cell, wherein the one or more standard parameters are based on one or more standard characteristics common to a plurality of satellites including the second satellite, and wherein the one or more satellite-cell specific parameters are based on a change to at least one standard characteristic of the one or more standard characteristics of the second satellite, receive a satellite-cell connection request from the UE, via the first satellite, for accessing the first cell after transmitting the one or more standard parameters or the one or more satellite-cell specific parameters, and communicate with the UE via the first satellite.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature, or function or embodied in several components, steps, or functions. Additional stages, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present stages of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at user equipment (UE) in a non-terrestrial network, comprising:
    receiving a radio resource control (RRC) message that indicates that the UE is to release from an active mode into an idle mode on a second cell before selecting a first cell and to select the first cell associated with a first satellite for the wireless communication in the non-terrestrial network based on a group identification identifying one or more satellite-cell groups for initiating selection by the UE;
    selecting the first cell associated with the first satellite for wireless communication in the non-terrestrial network;
    determining whether to use either one or more standard parameters or one or more satellite-cell specific parameters for accessing the first cell, wherein the one or more standard parameters are based on one or more standard characteristics common to a plurality of satellites including the first satellite, and wherein the one or more satellite-cell specific parameters are used if it is determined that a change to at least one standard characteristic of the one or more standard characteristics of the first satellite has occurred; and communicating with a base station via the first satellite.

2. The method of claim 1, further comprising:

receiving a first system information block (SIB1) identifying the one or more standard parameters or the one or more satellite-cell specific parameters in response to determining to transition from a second cell associated with a second satellite; and wherein determining whether to use the one or more standard parameters or the one or more satellite-cell specific parameters for accessing the first cell is based on whether the first system information block identifies the one or more standard parameters or the one or more satellite-cell specific parameters are usable.

3. The method of claim 1, further comprising:

receiving a first system information block identifying the one or more satellite-cell specific parameters for accessing the first cell; and wherein determining whether to use the one or more standard parameters or the one or more satellite-cell specific parameters for accessing the first cell comprises:

identifying a list of one or more frequencies and one or more physical cell identifications (PCIDs) associated with the first satellite, and identifying whether a frequency or a physical cell identification for accessing the first cell is included in the list.

4. The method of claim 1, wherein determining whether to use the one or more standard parameters or the one or more satellite-cell specific parameters for accessing the first cell comprises:

receiving a master information block (MIB) identifying whether the one or more standard parameters or the one or more satellite-cell specific parameters are usable.

5. The method of claim 4, wherein the master information block identifies the one or more standard parameters or the one or more satellite-cell specific parameters in a bit field utilizing a signal bit.

6. The method of claim 1, wherein the radio resource control message further includes at least one change in a priority for one or more satellites including the first satellite or one or more cells including the first cell and the second cell, and the radio resource control message further indicates that the UE is to:

release from the active mode into the idle mode on a second cell before selecting the first cell, and select the first cell associated with the first satellite for the wireless communication in the non-terrestrial network based on the at least one change in priority.

7. The method of claim 1, wherein the one or more satellite-cell groups each include a list of one or more satellites and one or more beam identifications that share at least one of one or more same access parameters or one or more same beam configurations.

8. The method of claim 1, wherein the radio resource control message further comprises a list change indication of at least one change to a list of neighbor cells, an inter-frequency list, or an inter-radio access technology (inter-RAT) list, reselection information on a list of neighbor cells, reselection information on an inter-frequency list, or reselection information on an inter-radio access technology (inter-RAT) list, and wherein:

the radio resource control message indicates that the UE is to release from the active mode into the idle mode on the second cell before selecting the first cell, and select the first cell associated with the first satellite for the wireless communication in the non-terrestrial network based on the list change indication.

9. The method of claim 1, wherein the one or more standard parameters comprise at least one of one or more satellite-cell access parameters, one or more satellite-cell configurations, one or more sets of beam information, or ephemeris information or common parameters for one or more satellites or cells.

10. The method of claim 1, wherein the one or more standard characteristics comprise at least one of a location of the first satellite, an earth area coverage associated with the first satellite, an indication of the base station associated with the first satellite, an indication of a feeder link providing communication between the first satellite and the base station, an indication of an access and mobility management function (AMF) associated with the first satellite, or an indication of a feeder link providing communication between the first satellite and an access and mobility management function.

11. The method of claim 1, further comprising:

receiving a first system information block (SIB1) identifying the one or more standard parameters or the one or more satellite-cell specific parameters; and wherein determining whether to use the one or more standard parameters or the one or more satellite-cell specific parameters for accessing the first cell is based on whether the first system information block identifies the one or more standard parameters or the one or more satellite-cell specific parameters.

12. The method of claim 11, wherein the first system information block further comprises a first indication of at least one of:

a current change or future change to beam pattern information associated with one or more other satellites located in area the includes the first satellite, or one or more beam pattern profile identifications of one or more beam pattern profiles associated with one or more other satellites associated with the area including the first satellite.

13. The method of claim 11, wherein the first system information block further comprises a second indication of at least one of:

an ephemeris associated with the first satellite, beam pattern information associated with the first satellite, a list of one or more neighbor cells, or inter-frequency and inter-radio access technology (inter-RAT) cell reselection information.

14. The method of claim 11, wherein the first system information block further comprises a system value tag associated with at least the first satellite.

15. The method of claim 11, wherein the first system information block further comprises a group identification identifying one or more satellite-cell groups for initiating reselection by the UE, wherein the one or more satellite-cell groups each include a list of one or more satellites and one or more beam identifications that share at least one of one or more same access parameters or one or more same beam configurations.

16. The method of claim 1, further comprising:
receiving a master information block identifying whether to use the one or more standard parameters or the one or more satellite-cell specific parameters for accessing the first cell, and
receiving a first system information block identifying either the one or more standard parameters or the one or more satellite-cell specific parameters for accessing the first cell; and wherein determining whether to use the one or more standard parameters or the one or more satellite-cell specific parameters for accessing the first cell is based on whether the first system information block identifies the one or more standard parameters or the one or more satellite-cell specific parameters.

17. The method of claim 1, further comprising:
identifying a release from an active mode into an idle mode on a second cell before selecting the first cell, and
receiving a radio resource control (RRC) message identifying the one or more standard parameters or the one or more satellite-cell specific parameters; and
wherein determining whether to use the one or more standard parameters or the one or more satellite-cell specific parameters for accessing the first cell comprises:
determining whether to use the one or more standard parameters or the one or more satellite-cell specific parameters for accessing the first cell based on whether the radio resource control message identifies the one or more standard parameters or the one or more satellite-cell specific.

18. The method of claim 1, wherein at least one of the one or more standard parameters or one or more satellite-cell specific parameters are associated with a fixed geographic area.

19. The method of claim 18, wherein the fixed geographic area is determined based on one of fixed tracking area identification, a virtual cell identification, or fixed cell identification.

20. A user equipment (UE) for wireless communication in a non-terrestrial network (NTN), comprising:
a wireless transceiver;
a memory; and
a processor communicatively coupled to the wireless transceiver and the memory, wherein the processor and the memory are configured to:
receive a radio resource control (RRC) message that indicates that the UE is to release from an active mode into an idle mode on a second cell before selecting a first cell and to select the first cell associated with a first satellite for the wireless communication in the non-terrestrial network based on a group identification identifying one or more satellite-cell groups for initiating selection by the UE;
select the first cell associated with the first satellite for wireless communication in the non-terrestrial network;
determine whether to use either one or more standard parameters or one or more satellite-cell specific parameters for accessing the first cell, wherein the one or more standard parameters are based on one or more standard characteristics common to a plurality of satellites including the first satellite, and wherein the one or more satellite-cell specific parameters are used if it is determined that a change to at least one standard characteristic of the one or more standard characteristics of the first satellite has occurred; and
communicate with a base station via the first satellite.

21. A method for wireless communication at a base station in communication with a user equipment (UE), via one or more satellites, in a non-terrestrial network, comprising:
transmitting a radio resource control (RRC) message that indicates that the UE is to release from an active mode into an idle mode on a second cell before selecting a first cell and to select the first cell associated with a first satellite for the wireless communication in the non-terrestrial network based on a group identification identifying one or more satellite-cell groups for initiating selection by the UE;
transmitting, via the first cell associated with the first satellite of the one or more satellites, one or more standard parameters or one or more satellite-cell specific parameters for accessing the first cell, wherein the one or more standard parameters are based on one or more standard characteristics common to a plurality of satellites including the first satellite, and wherein the one or more satellite-cell specific parameters are based on a change to at least one standard characteristic of the one or more standard characteristics of the the satellite;
receiving a satellite-cell connection request from the UE, via the first satellite, for accessing the first cell after transmitting the one or more standard parameters or the one or more satellite-cell specific parameters; and
communicating with the UE via the first satellite.

22. The method of claim 20, wherein the radio resource control message further includes at least one change in a priority to one or more satellites including the first satellite or one or more cells including the first cell and the second cell, and wherein the radio resource control message indicates that the UE is to release from the active mode into the idle mode on a second cell before selecting the first cell, and select the first cell associated with the first satellite for the wireless communication in the non-terrestrial network based on the at least one change in priority.

23. The method of claim 20, wherein the radio resource control message further comprises a list change indication of at least one change to a list of neighbor cells, an inter-frequency list, or an inter-radio access technology (inter-RAT) list, reselection information on a list of neighbor cells, reselection information on an inter-frequency list, or reselection information on an inter-radio access technology (inter-RAT) list, and
wherein the radio resource control message indicates that the UE is to release from the active mode into the idle mode on the second cell before selecting the first cell, and select the first cell associated with the first satellite for the wireless communication in the non-terrestrial network based on the list change indication.

24. The method of claim 21, wherein receiving the satellite-cell connection request from the UE for accessing the first cell after determining whether to use the one or more standard parameters or the one or more satellite-cell specific parameters comprises:
receiving the satellite-cell connection request from the UE for accessing the first cell based on the one or more standard parameters when transmitting the one or more standard parameters for accessing the first cell, and
receiving the satellite-cell connection request from the UE for accessing the first cell based on the one or more satellite-cell specific parameters when transmitting the one or more satellite-cell specific parameters for accessing the first cell.

25. The method of claim 21, wherein the one or more standard characteristics comprise at least one of a location of the first satellite, an earth area coverage associated with the first satellite, an indication of a base station associated with the first satellite, an indication of a feeder link providing communication between the first satellite and a base station, an indication of an access and mobility management function (AMF) associated with the first satellite, or an indication of a feeder link providing communication between the first satellite and an access and mobility management function.

26. The method of claim 21, wherein transmitting, via the first cell associated with the first satellite of the one or more satellites, the one or more standard parameters or the one or more satellite-cell specific parameters for accessing the first cell comprises:
  transmitting a first system information block (SIB1) identifying the one or more standard parameters or the one or more satellite-cell specific parameters.

27. The method of claim 26, wherein the first system information block further comprises a first indication of at least one of:
  a current change or future change to beam pattern information associated with one or more other satellites located in area the includes the first satellite, or
  one or more beam pattern profile identifications of one or more beam pattern profiles associated with one or more other satellites associated with the area including the first satellite.

28. A base station in a non-terrestrial network (NTN), comprising:
  a wireless transceiver;
  a memory; and
  a processor communicatively coupled to the wireless transceiver and the memory, wherein the processor and the memory are configured to:
    transmit a radio resource control (RRC) message to a UE that indicates that the UE is to release from an active mode into an idle mode on a second cell before selecting a first cell and to select the first cell associated with a first satellite for the wireless communication in the non-terrestrial network based on a group identification identifying one or more satellite-cell groups for initiating selection by the UE,
    transmit, via the first cell associated with the first satellite of the one or more satellites, one or more standard parameters or one or more satellite-cell specific parameters for accessing the first cell, wherein the one or more standard parameters are based on one or more standard characteristics common to a plurality of satellites including the first satellite, and wherein the one or more satellite-cell specific parameters are based on a change to at least one standard characteristic of the one or more standard characteristics of the first satellite,
    receive a satellite-cell connection request from the UE, via the first satellite, for accessing the first cell after transmitting the one or more standard parameters or the one or more satellite-cell specific parameters, and
    communicate with the UE via the first satellite.

* * * * *